United States Patent
Oyama

(10) Patent No.: US 9,518,752 B2
(45) Date of Patent: Dec. 13, 2016

(54) RECORDING MEDIUM STORING APPARATUS CONTROL PROGRAM, APPARATUS CONTROL SYSTEM, AND APPARATUS CONTROL DEVICE

(71) Applicant: SOCIONEXT INC., Yokohama-shi, Kanagawa (JP)

(72) Inventor: Kazuyoshi Oyama, Hino (JP)

(73) Assignee: SOCIONEXT INC., Yokohama (JP)

( * ) Notice: Subject to any disclaimer, the term of this patent is extended or adjusted under 35 U.S.C. 154(b) by 447 days.

(21) Appl. No.: 14/165,959

(22) Filed: Jan. 28, 2014

(65) Prior Publication Data

US 2014/0229017 A1 Aug. 14, 2014

(30) Foreign Application Priority Data

Feb. 13, 2013 (JP) ................. 2013-025442

(51) Int. Cl.
G05D 23/19 (2006.01)
F24F 11/00 (2006.01)

(52) U.S. Cl.
CPC ......... *F24F 11/006* (2013.01); *G05D 23/1905* (2013.01); *F24F 2011/0036* (2013.01); *F24F 2011/0064* (2013.01); *F24F 2011/0065* (2013.01)

(58) Field of Classification Search
None
See application file for complete search history.

(56) References Cited

U.S. PATENT DOCUMENTS

2001/0027862 A1* 10/2001 Sugawara .......... G05D 23/1904
165/238

FOREIGN PATENT DOCUMENTS

JP 2006-323943 11/2006
JP EP 2789925 A1 * 10/2014 .......... F24F 11/0012

* cited by examiner

Primary Examiner — Isaac T Tecklu
(74) Attorney, Agent, or Firm — Staas & Halsey LLP

(57) ABSTRACT

A medium having stored therein a program, the program causing a computer to execute a process, the process comprising: selecting a vibration medium corresponding to first vibration data, on the basis of matching between the first vibration data and the reference vibration data, the first vibration data corresponding to first vibration transmitted via the vibration medium and detected; selecting reference vibration data corresponding to second vibration data, from among the reference vibration data stored in the reference data storage unit on the basis of the second vibration data and a correction value of the reference vibration data, the second vibration data corresponding to second vibration transmitted via the selected vibration medium and detected; updating a correction value of the selected reference vibration data on the basis of the second vibration data; and generating a control signal for controlling the apparatus on the basis of the selected reference vibration data.

15 Claims, 23 Drawing Sheets

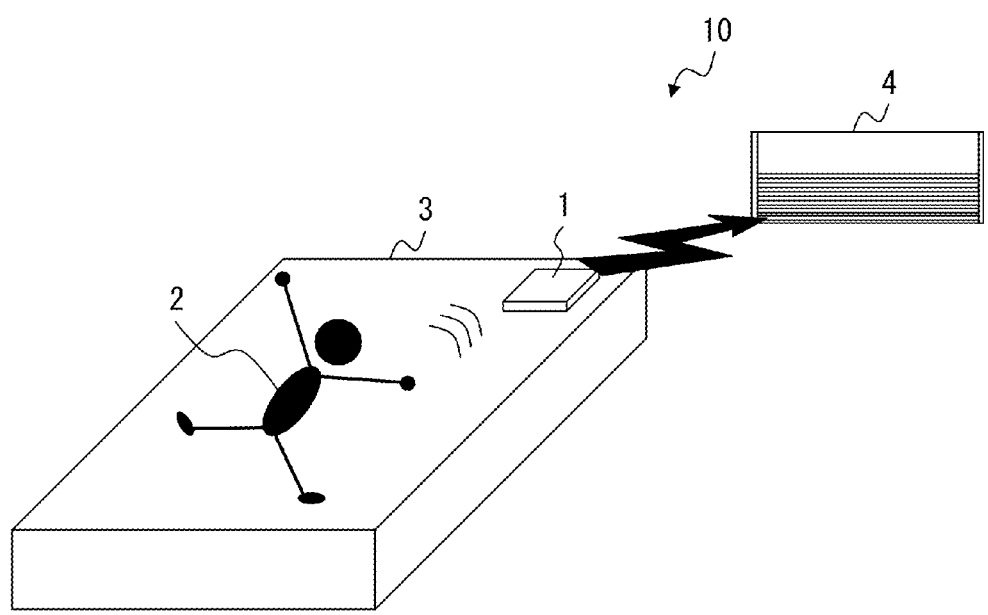
F I G. 1

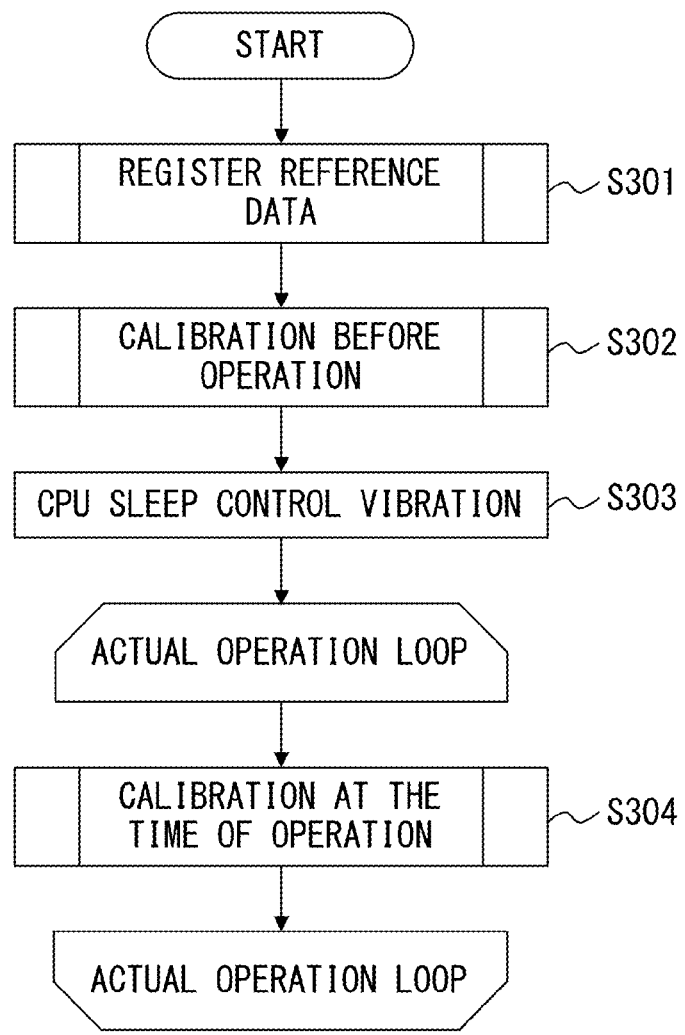
F I G. 3

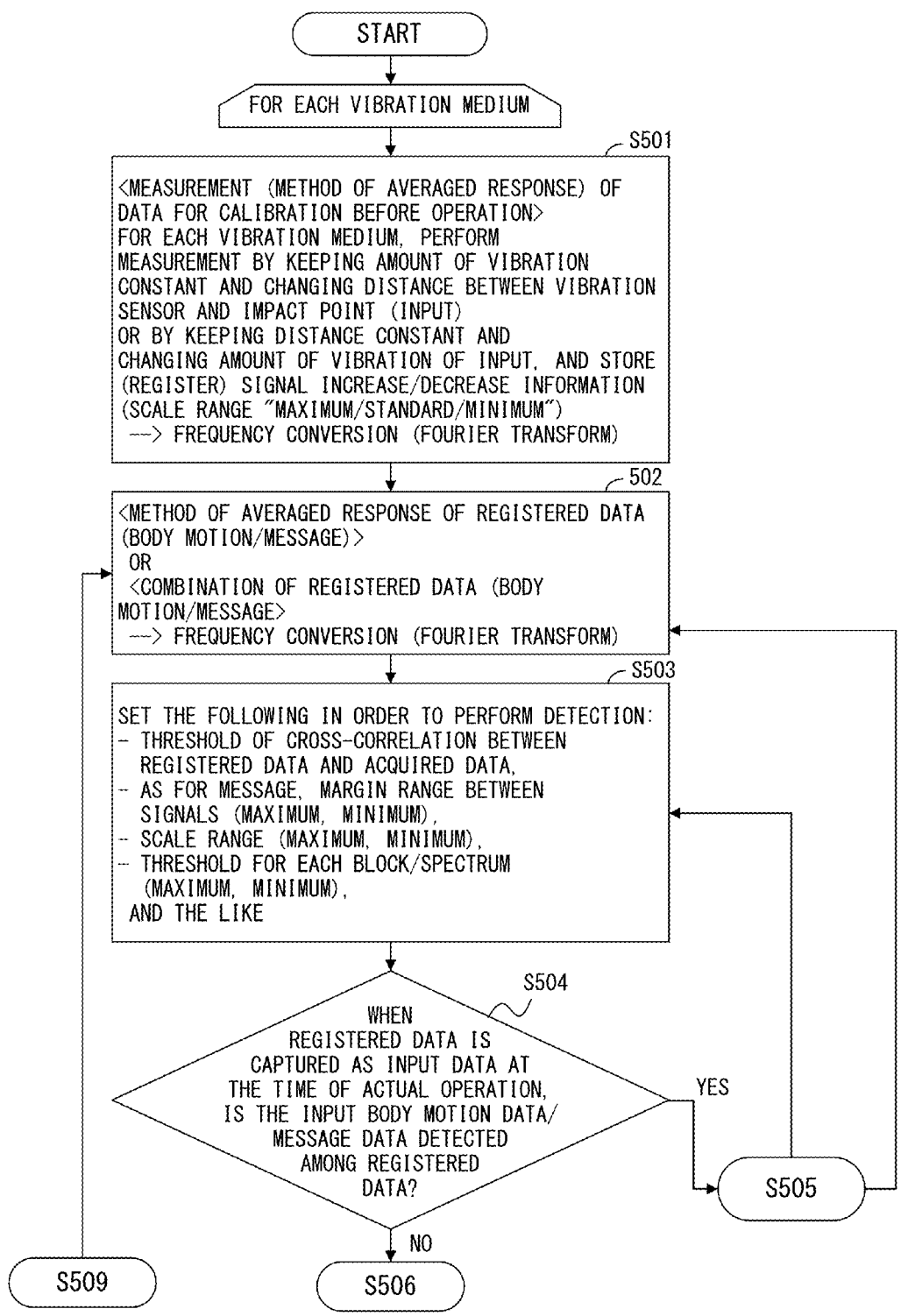
F I G. 5 A

| VIBRATION MEDIUM (ID) | SIGNAL CLASSIFICATION (ID) *(VIBRATION MEDIUM ID, SIGNAL TYPE ID, SIGNAL KIND ID, ENVIRONMENT TYPE ID) | SENSOR-INPUT DISTANCE [m] | INPUTTED IMPULSIVE FORCE [kg·m/s] | VIBRATION DATA | TOTAL AMOUNT OF ENERGY OF VIBRATION DATA | THE NUMBER OF SIGNALS |
|---|---|---|---|---|---|---|
| VIBRATION MEDIUM A (001) | CALIBRATION DATA (001, 1, 1, 1) | 0.2 | 1 | 0.5, 0.7, 1… | 350 | 1 |
| " | CALIBRATION DATA (001, 1, 1, 2) | 0.6 | 1 | 0.3, 0.6, 0.9… | 300 | 1 |
| " | CALIBRATION DATA (001, 1, 1, 3) | 1 | 1 | 0.1, 0.2, 0.3… | 240 | 1 |
| VIBRATION MEDIUM B (002) | CALIBRATION DATA (002, 1, 1, 1) | 0.2 | 1 | 0.6, 0.9, 1.2… | 450 | 1 |
| " | CALIBRATION DATA (002, 1, 1, 2) | 0.6 | 1 | 0.4, 0.6, 0.8… | 350 | 1 |
| " | CALIBRATION DATA (002, 1, 1, 3) | 1 | 1 | 0.1, 0.2, 0.3… | 250 | 1 |
| VIBRATION MEDIUM C (003) | CALIBRATION DATA (003, 1, 1, 1) | 0.2 | 1 | 0.5, 0.6, 0.7… | 350 | 1 |
| " | CALIBRATION DATA (003, 1, 1, 2) | 0.6 | 1 | 0.3, 0.5, 0.6… | 300 | 1 |
| " | CALIBRATION DATA (003, 1, 1, 3) | 1 | 1 | 0.2, 0.3, 0.4… | 240 | 1 |

{ CALIBRATION DATA

F I G. 6 A

| CORRELATION THRESHOLD *(FOR EACH SIGNAL) | MARGIN RANGE BETWEEN SIGNALS [sec] *(MINIMUM, BASE, MAXIMUM) ... | TOTAL ENERGY RANGE OF EACH SIGNAL *(MINIMUM, BASE, MAXIMUM) ... | ENERGY RANGE FOR EACH BLOCK OF EACH SIGNAL *(MINIMUM, BASE, MAXIMUM) ... | RANGE OF AMPLITUDE SPECTRUM OF EACH SIGNAL *(MINIMUM, BASE, MAXIMUM) ... | TEMPERATURE/HUMIDITY RANGE *TEMPERATURE (MINIMUM, BASE, MAXIMUM), HUMIDITY (MINIMUM, BASE, MAXIMUM) |
|---|---|---|---|---|---|
| 0.8 | ... | ... | [(0, 3, 6), (0, 3, 6), ...] | [(0, 0.05, 0.1), (0, 0.04, 0.1), ...] | ... |
| 0.7 | ... | ... | [(0, 2, 5), (0, 2, 5), ...] | [(0, 0.03, 0.1), (0, 0.04, 0.1), ...] | ... |
| 0.6 | ... | ... | [(0, 1, 4), (0, 1, 4), ...] | [(0, 0.02, 0.1), (0, 0.01, 0.1), ...] | ... |
| 0.8 | ... | ... | [(0, 4, 7), (0, 4, 7), ...] | [(0, 0.02, 0.1), (0, 0.04, 0.1), ...] | ... |
| 0.7 | ... | ... | [(0, 3, 6), (0, 3, 6), ...] | [(0, 0.04, 0.1), (0, 0.02, 0.1), ...] | ... |
| 0.6 | ... | ... | [(0, 2, 5), (0, 2, 4), ...] | [(0, 0.02, 0.1), (0, 0.01, 0.1), ...] | ... |
| 0.8 | ... | ... | [(0, 3, 6), (0, 3, 6), ...] | [(0, 0.02, 0.1), (0, 0.01, 0.1), ...] | ... |
| 0.7 | ... | ... | [(0, 2, 5), (0, 2, 5), ...] | [(0, 0.02, 0.1), (0, 0.01, 0.1), ...] | ... |
| 0.6 | ... | ... | [(0, 3, 6), (0, 3, 6), ...] | [(0, 0.03, 0.1), (0, 0.02, 0.1), ...] | ... |

F I G. 6 B

| VIBRATION MEDIUM (ID) | SIGNAL CLASSIFICATION (ID) *(VIBRATION MEDIUM ID, SIGNAL TYPE ID, SIGNAL KIND ID, ENVIRONMENT TYPE ID) | SENSOR-INPUT DISTANCE [m] | INPUTTED IMPULSIVE FORCE [kg·m/s] | VIBRATION DATA | TOTAL AMOUNT OF ENERGY OF VIBRATION DATA | THE NUMBER OF SIGNALS |
|---|---|---|---|---|---|---|
| VIBRATION MEDIUM A (001) | MESSAGE DATA (001, 2, 1, 1) | 0.2 | 1,1,1 | 0.6, 0.9, 1.2··· | 1050 | 3 |
| ″ | MESSAGE DATA (001, 2, 1, 2) | 0.6 | 1,1,1 | 0.3, 0.5, 0.6··· | 900 | 3 |
| ″ | MESSAGE DATA (001, 2, 1, 3) | 1 | 1,1,1 | 0.1, 0.2, 0.3··· | 720 | 3 |
| ″ | MESSAGE DATA (001, 2, 2, 1) | 0.2 | 1,1,1,1 | 0.6, 0.9, 1.2··· | 1400 | 4 |
| ″ | MESSAGE DATA (001, 2, 2, 2) | 0.6 | 1,1,1,1 | 0.3, 0.5, 0.6··· | 1200 | 4 |
| ″ | MESSAGE DATA (001, 2, 2, 3) | 1 | 1,1,1,1 | 0.1, 0.2, 0.3··· | 960 | 4 |
| VIBRATION MEDIUM B (002) | MESSAGE DATA (001, 3, 1, 1) | — | — | 0.03, 0.06, 0.09··· | 300 | 1 |

MESSAGE/BODY MOTION DATA

F I G. 6 C

| CORRELATION THRESHOLD *(FOR EACH SIGNAL) | MARGIN RANGE BETWEEN SIGNALS [sec] *(MINIMUM, BASE, MAXIMUM) | TOTAL ENERGY RANGE OF EACH SIGNAL *(MINIMUM, BASE, MAXIMUM) | ENERGY RANGE FOR EACH BLOCK OF EACH SIGNAL *(MINIMUM, BASE, MAXIMUM) | RANGE OF AMPLITUDE SPECTRUM OF EACH SIGNAL *(MINIMUM, BASE, MAXIMUM) | TEMPERATURE/HUMIDITY RANGE *TEMPERATURE (MINIMUM, BASE, MAXIMUM), HUMIDITY (MINIMUM, BASE, MAXIMUM) |
|---|---|---|---|---|---|
| 0.6 (0.8, 0.8, 0.8) | (0.8, 1.0, 1.2), (0.4, 0.5, 0.6) | (300, 350, 400), (300, 350, 400), (300, 350, 400) | [(0, 3, 6), (0, 3, 6), (0, 3, 6), ...] | [(0, 0.05, 0.1), (0, 0.05, 0.1), (0, 0.05, 0.1), ...] | — |
| 0.55 (0.7, 0.7, 0.7) | (0.8, 1.0, 1.2), (0.4, 0.5, 0.6) | (250, 300, 350), (250, 300, 350), (250, 300, 350) | [(0, 2, 5), (0, 2, 5), (0, 2, 5), ...] | [(0, 0.03, 0.1), (0, 0.03, 0.1), (0, 0.03, 0.1), ...] | — |
| 0.5 (0.6, 0.6, 0.6) | (0.8, 1.0, 1.2), (0.4, 0.5, 0.6) | (200, 240, 280), (200, 240, 280), (200, 240, 280) | [(0, 1, 4), (0, 1, 4), (0, 1, 4), ...] | [(0, 0.02, 0.1), (0, 0.02, 0.1), (0, 0.02, 0.1), ...] | — |
| 0.5 (0.8, 0.8, 0.8) | (0.4, 0.5, 0.6), (0.4, 0.5, 0.6), (0.4, 0.5, 0.6) | (300, 350, 400), (300, 350, 400), (300, 350, 400) | [(0, 3, 6), (0, 3, 6), (0, 3, 6), ...] | [(0, 0.05, 0.1), (0, 0.05, 0.1), (0, 0.05, 0.1), ...] | — |
| 0.45 (0.7, 0.7, 0.7) | (0.4, 0.5, 0.6), (0.4, 0.5, 0.6), (0.4, 0.5, 0.6) | (250, 300, 350), (250, 300, 350), (250, 300, 350) | [(0, 2, 5), (0, 2, 5), (0, 2, 5), ...] | [(0, 0.03, 0.1), (0, 0.03, 0.1), (0, 0.03, 0.1), ...] | — |
| 0.4 (0.6, 0.6, 0.6) | (0.4, 0.5, 0.6), (0.4, 0.5, 0.6), (0.4, 0.5, 0.6) | (200, 240, 280), (200, 240, 280), (200, 240, 280) | [(0, 1, 4), (0, 1, 4), (0, 1, 4), ...] | [(0, 0.02, 0.1), (0, 0.02, 0.1), (0, 0.02, 0.1), ...] | — |
| 0.3 | — | — | [(0, 0, 2), (0, 0, 2), ...] | [(0, 0.04, 0.1), (0, 0.02, 0.1), ...] | (25, 28, 40), (40, 60, 100) |

FIG. 6D

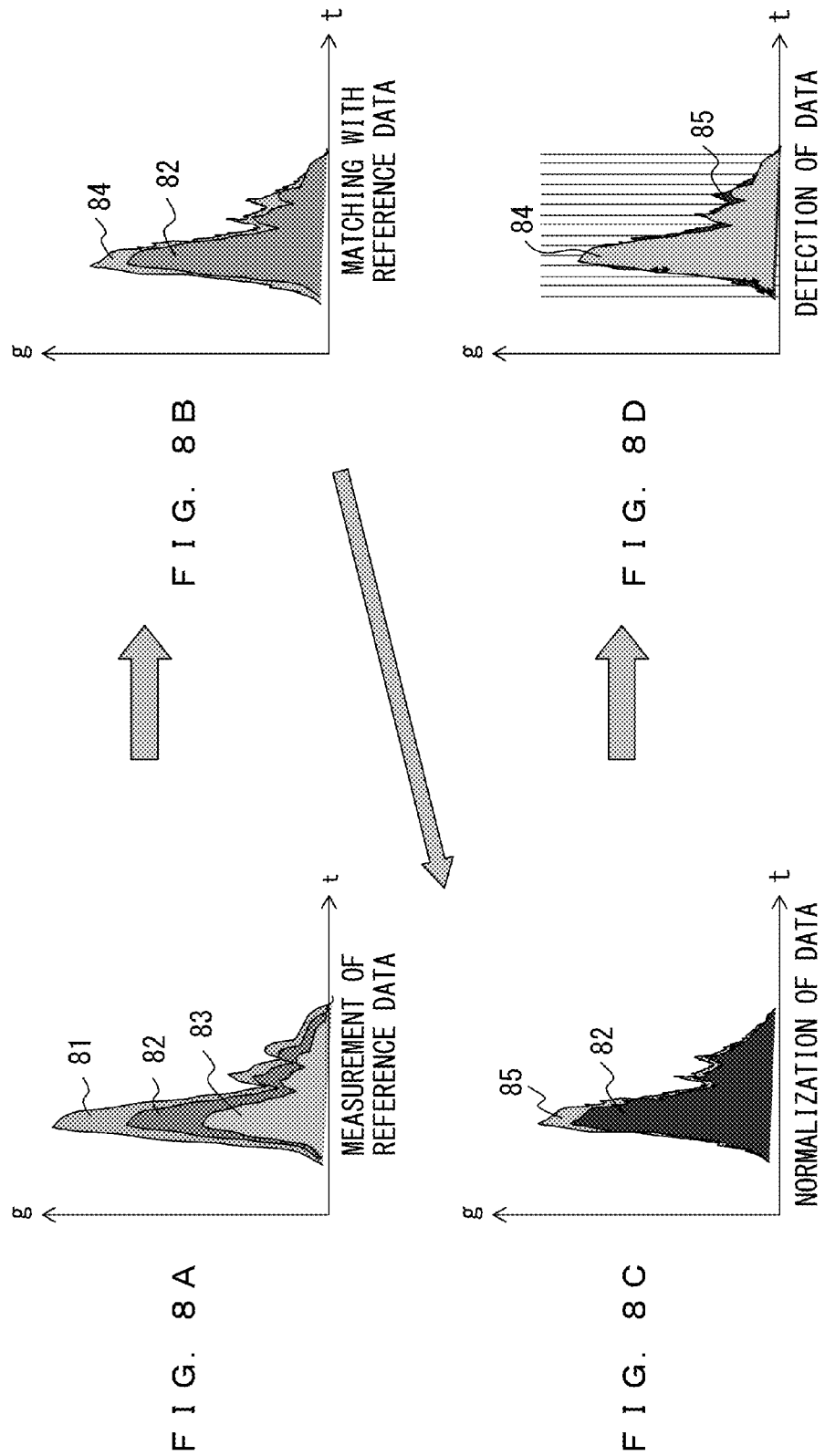

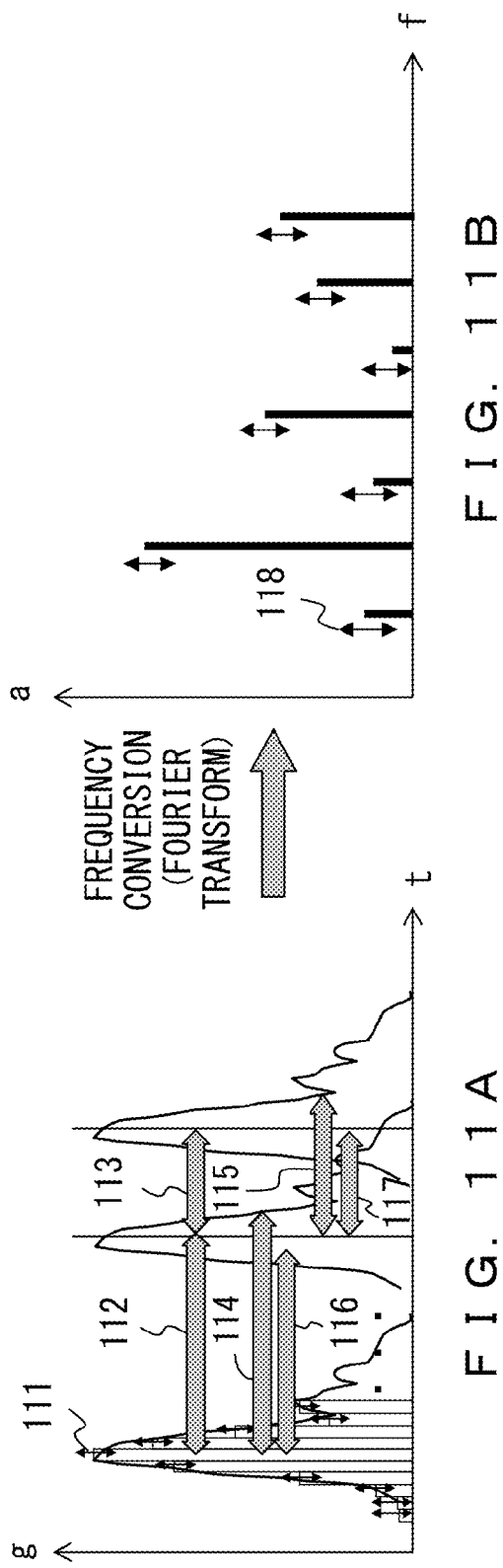

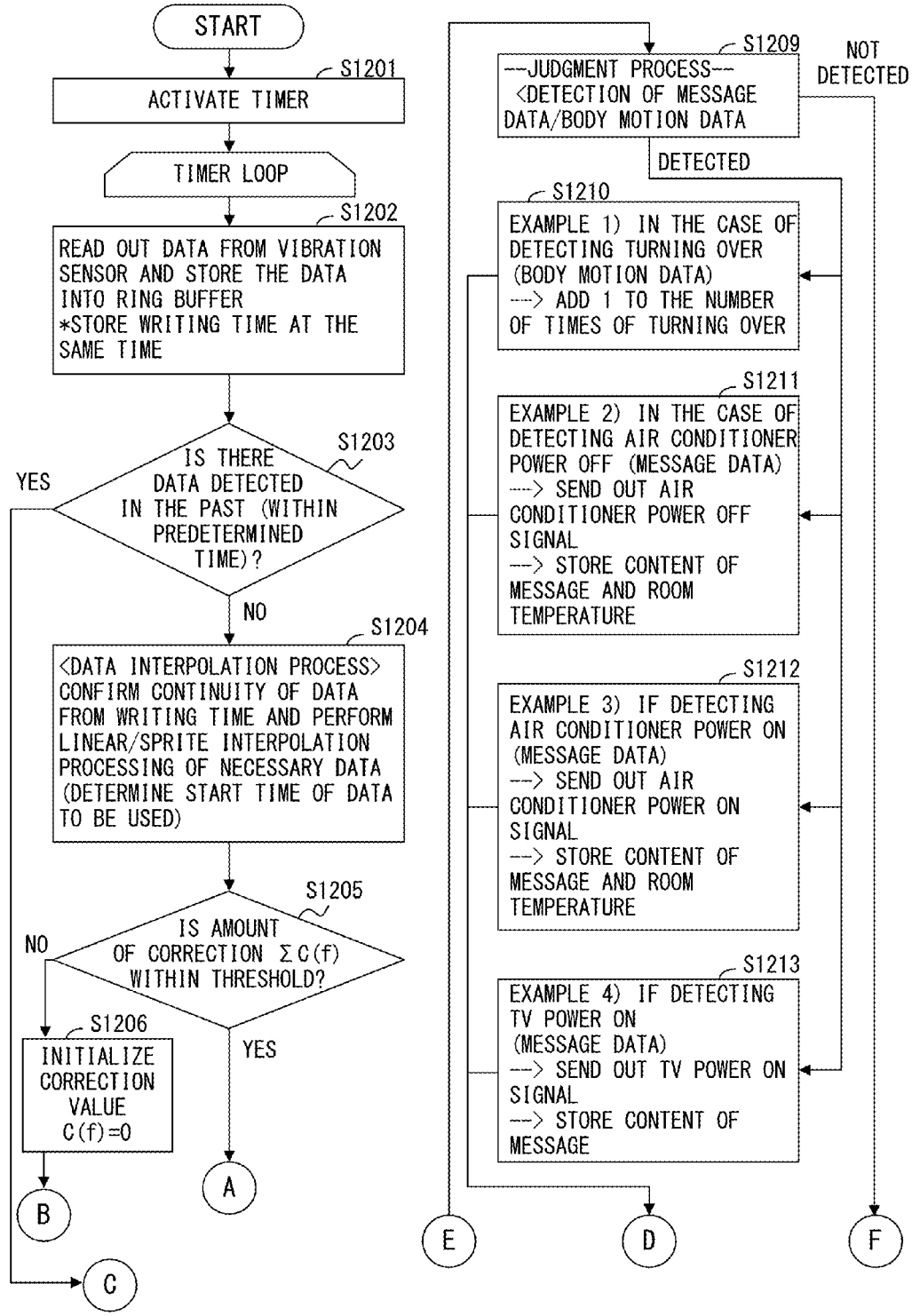
F I G. 1 2 A

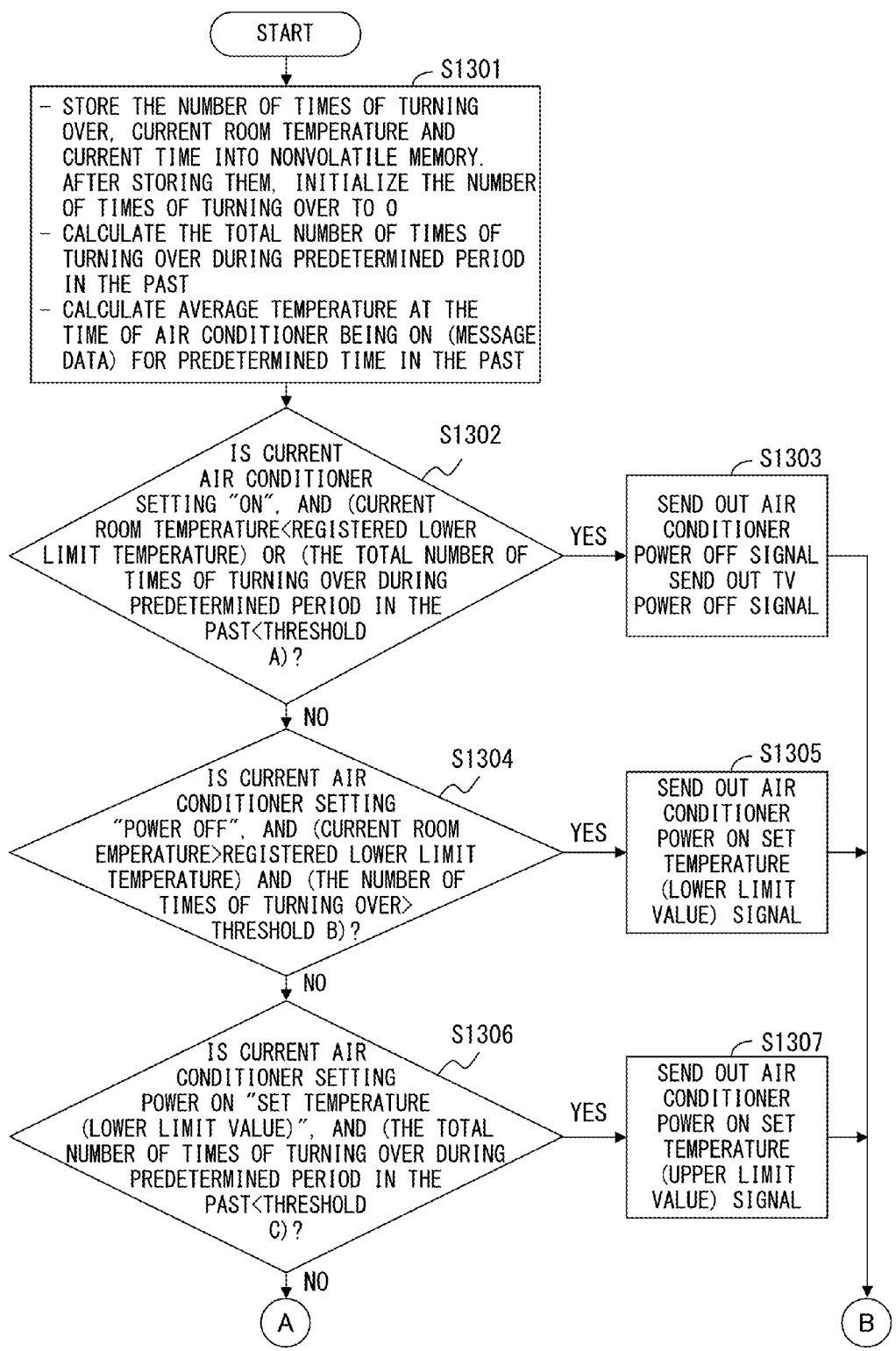
F I G. 1 3 A

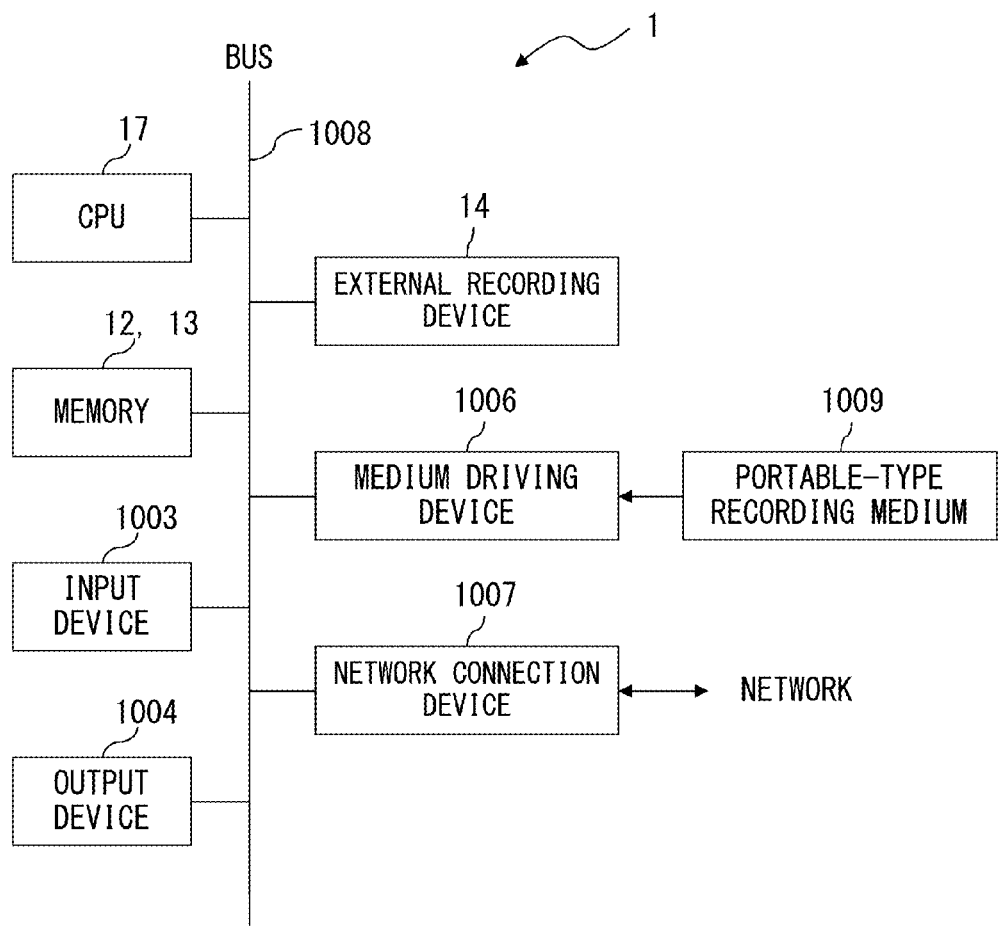
F I G. 1 4

RECORDING MEDIUM STORING APPARATUS CONTROL PROGRAM, APPARATUS CONTROL SYSTEM, AND APPARATUS CONTROL DEVICE

CROSS-REFERENCE TO RELATED APPLICATION

This application is based upon and claims the benefit of priority of the prior Japanese Patent Application No. 2013-025442, filed on Feb. 13, 2013, the entire contents of which are incorporated herein by reference.

FIELD

The present invention relates to a recording medium storing an apparatus control program, an apparatus control system and an apparatus control device.

BACKGROUND

As an example of an electronic apparatus, an air conditioner is given. For example, it is ideal that an air conditioner is always operated at an air conditioning temperature that its user feels comfortable. In general, the air conditioning temperature is set by the user using a remote controller, and operation control of the air conditioner is performed so that the set temperature is kept in the room. If the user feels hot or cold, the comfortableness is kept by the user changing the setting of the air conditioning temperature using the remote controller again.

However, if the user does not have the remote controller at hand, the user cannot control the operation of the air conditioner. For example, while sleeping, it may happen that the user cannot have the remote controller nearby or cannot find the remote controller because it is too dark or the user is too sleepy.

A technique is disclosed in which, when it is not possible to operate a remote controller as described above, an air conditioner is controlled on the basis of a user's motion or voice, with the use of an image recognition technique or a voice recognition technique. However, since the user is generally in a dark environment when sleeping, it may happen that the user cannot perform appropriate image processing or that he/she cannot perform voice recognition in consideration of those around the user.

Patent Document 1 discloses a technique in which an external impact is a user input signal, as a technique for transmitting a user instruction to an electronic apparatus without making a loud sound under a dark environment.

DOCUMENTS OF PRIOR ART

Patent Document

Patent Document 1: Japanese Laid-open Patent Publication No. 2006-323943

As described above, for example, in the case of an air conditioner, the technique in which an external impact is a user input signal is effective to transmit a user instruction to the air conditioner at the time of sleeping in darkness and quietness.

However, there is a problem that, since the transmission characteristic of a vibration medium for transmitting the external impact to the air conditioner differs according to each individual, it is difficult to accurately identify intention information obtained by a vibration sensor.

SUMMARY

According to an aspect of the embodiments, a non-transitory computer-readable recording medium having stored therein an apparatus control program for controlling an apparatus to be a control target, the apparatus control program causing a computer to execute a process, the process comprising: selecting a vibration medium corresponding to first vibration data, by referring to a reference data storage unit storing reference vibration data in association with vibration medium information identifying the vibration medium, on the basis of matching between the first vibration data and the reference vibration data, the first vibration data corresponding to first vibration transmitted via the vibration medium and detected by a vibration detection unit; selecting reference vibration data corresponding to second vibration data, from among the reference vibration data stored in the reference data storage unit on the basis of the second vibration data and a correction value of the reference vibration data, the second vibration data corresponding to second vibration transmitted via the selected vibration medium and detected by the vibration detection unit; updating a correction value of the selected reference vibration data on the basis of the second vibration data; and generating a control signal for controlling the apparatus on the basis of the selected reference vibration data.

The object and advantages of the invention will be realized and attained by means of the elements and combinations particularly pointed out in the claims.

It is to be understood that both the forgoing general description and the following detailed description are exemplary and explanatory and are not restrictive of the invention.

BRIEF DESCRIPTION OF DRAWINGS

FIG. 1 is a diagram for illustrating the outline of the present invention;

FIG. 3 is a flowchart showing the process flow of an apparatus control program executed by the apparatus control device 1;

FIGS. 5A and 5B are flowcharts showing the flow of the reference data registration process;

FIGS. 6A, 6B, 6C and 6D are diagrams showing a structure example of reference data;

FIGS. 8A, 8B, 8C and 8D are diagrams for illustrating a method for matching with the reference data (maximum/standard/minimum);

FIGS. 11A and 11B are diagrams for illustrating a method for detecting message data;

FIGS. 12A and 12B are flowcharts showing the flow of the calibration-at-the-time-of-operation process and an application example (1) after detection of intention information;

FIGS. 13A and 13B are flowcharts showing the flow of an application example (2) after detection of the intention information;

FIG. 14 is a diagram showing the hardware configuration of the apparatus control device 1 to which the present invention is applied.

DESCRIPTION OF EMBODIMENTS

Figure 2:
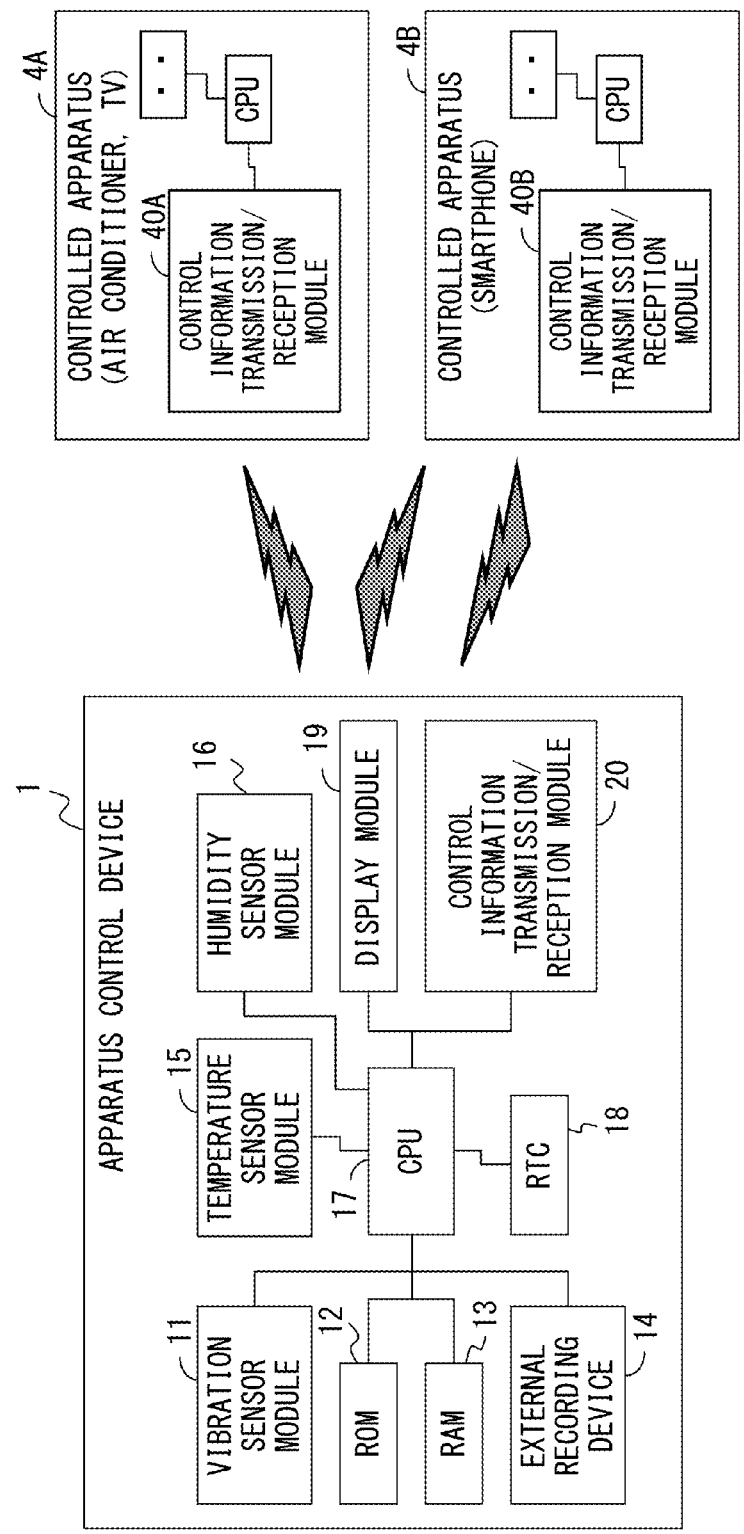
FIG. 2 is a hardware configuration diagram of an apparatus control device 1.

An embodiment of the present invention will be described in detail below with reference to drawings.

FIG. 1 is a diagram for illustrating the outline of the present invention.

In FIG. 1, an apparatus control system 10 to which the present invention is applied is provided with an apparatus control device 1, a vibration medium 3 and an air conditioner unit 4. In the apparatus control system 10, an instruction from a user 2 is transmitted to the apparatus control device 1 via the vibration medium 3, and the apparatus control device 1 which analyzes the instruction controls the operation of the air conditioner unit 4 by executing an apparatus control program to be described later. The vibration medium 3 is, for example, a bed.

The vibration medium 3 transmits vibration information generated by the user 2 to the apparatus control device 1 as an instruction from the user 2. Instructions from the user 2 are roughly classified into two kinds. One is an instruction given by the user 2 consciously hitting the vibration medium 3 with his hand or the like. The vibration medium 3 transmits the instruction to the apparatus control device 1 on the basis of the timing of the hit or the number of hits. Such an instruction is referred to as "message data" here. The other is an instruction which is generated by a body motion of the user 2, such as turning over, and unconsciously transmitted, and it is referred to as "body motion data" here.

The apparatus control device 1 analyzes these instructions generated by the user 2 by executing the apparatus control program, and inputs particular instruction information to the air conditioner unit 4, for example, via infrared communication or the like. The air conditioner unit 4 performs air conditioning in the room in accordance with the inputted particular instruction information. For example, the air conditioner unit 4 performs air conditioning such as turning on or off the power and changing a set temperature.

FIG. 2 is a hardware configuration diagram of the apparatus control device 1.

In FIG. 2, the apparatus control device 1 is provided with a vibration sensor module 11, a ROM (Read Only Memory) 12, a RAM (Random Access Memory) 13, an external recording device 14, a temperature sensor module 15, a humidity sensor module 16, a CPU (Central Processing Unit) 17, an RTC (Real Time Clock) 18, a display module 19 and a control information transmission/reception module 20.

The vibration sensor module 11 is, for example, an acceleration sensor which detects vibration transmitted to the apparatus control device 1 via the vibration medium 3. The temperature sensor module 11, the temperature sensor module 15 and the humidity sensor module 16 may be provided not inside but outside the apparatus control device 1 and externally connected.

The ROM 12 stores the apparatus control program, reference data and the like. The RAM 13 is a memory for executing the apparatus control program and the like. For example, the apparatus control program stored in advance in the ROM 12 is executed, with the RAM 13 as a work memory. The external recording device 14 stores calibration data before operation (selected reference data), the amount of correction at the time of operation, detected body motion data and message data, and the like.

The temperature sensor module 15 detects a room temperature, and the humidity sensor module 16 detects a room humidity.

The CPU 17 controls the whole apparatus control device 1 by controlling the vibration sensor module 11, the ROM 12, the RAM 13, the external recording device 14, the temperature sensor module 15, the humidity sensor module 16, the RTC 18, the display module 19 and the control information transmission/reception module 20.

The RTC 18 measures current time at the time of acquiring sensor data from the vibration sensor module 11, the temperature sensor module 15 and the humidity sensor module 16, at the time of detecting body motion data and message data, and the like.

The display module 19 displays various information such as existence/non-existence of vibration detection by the vibration sensor module 11, strength of vibration, temperature and humidity, and the like. The control information transmission/reception module 20 controls, for a control information transmission/reception module 40A of a controlled apparatus 4A and a control information transmission/reception module 40B of a controlled apparatus 4B, communication of power on/off control information, temperature control information and the like about the controlled apparatuses 4A and 4B, using infrared rays or the like.

Next, the process of the apparatus control program executed by the apparatus control device 1 will be described. In the present embodiment, description will be made especially on control of an air cooler function of the air conditioner unit 4 during summertime.

FIG. 3 is a flowchart showing the flow of the apparatus control program executed by the apparatus control device 1.

First, in step S301, a subroutine, a "reference data registration" process, is executed. Measurement and registration of calibration data and intention information are performed with the use of some vibration media 3 having different characteristics. This becomes reference data. The details of the reference data registration process will be described later.

Next, in step S302, a subroutine, a "calibration-before-operation" process, is executed. Measurement of calibration data is performed with the use of a vibration medium 3 to be actually used by the user 2, and a vibration medium 3 most similar to the reference data is searched for and determined. In a "calibration-at-the-time-of-operation" process to be described later, detection is performed on the basis of intention information (message data and body motion data) about the vibration medium 3 determined here. The details of a calibration-before-operation process will be described later.

Next, in step S303, threshold interruption and periodical timer interruption by the vibration sensor module 11 are set as sleep control of the CPU 17 for power saving.

Then, in step S304, a subroutine, a "calibration-at-the-time-of-operation" process, is executed. The calibration-at-the-time-of-operation process is always executed when the apparatus control system 10 is operated. A characteristic difference between the vibration medium 3 for which the reference data is registered and the vibration medium 3 used by the user 2 and a characteristic error due to environment are corrected, so that the accuracy of detecting intention information can be sequentially improved. There may be a case where the position of the apparatus control device 1, more specifically, the position of the vibration sensor module 11 at the time of detecting intention information and the place of impact point (vibration point) transmitting the intention information change. There may be a case where an object (a person, a comforter or the like) is steadily placed on the vibration medium 3. A transmission characteristic error which changes in such cases is referred to as a characteristic error by the environment. The details will be described later.

The reference data registration process will be described.

Figure 4:
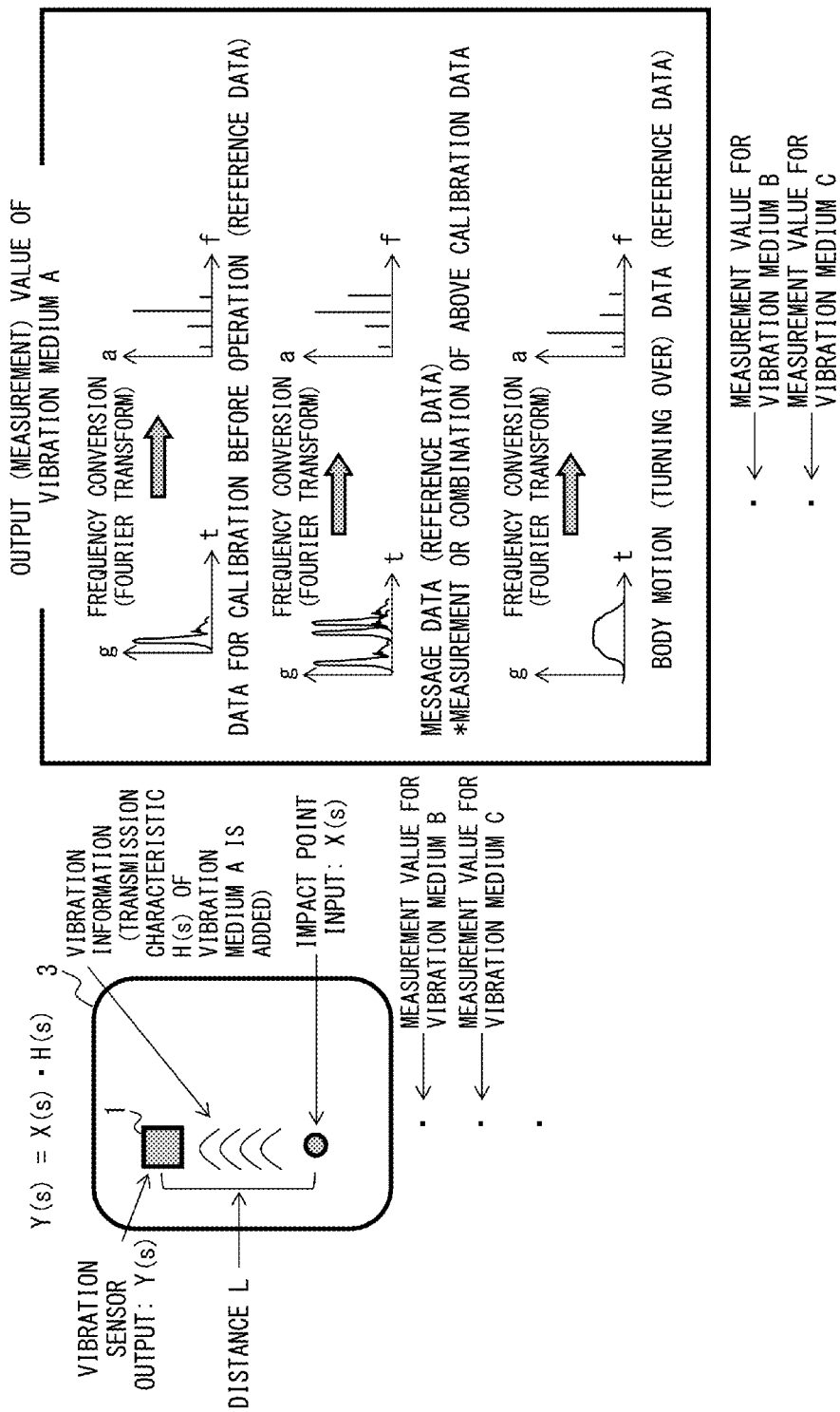
FIG. 4 is a diagram for illustrating the outline of a reference data registration process.

FIG. 4 is a diagram for illustrating the outline of the reference data registration process.

In the "reference data registration" process, some vibration media 3 (a vibration medium A, a vibration medium B and a vibration medium C) having different transmission characteristics, such as a spring coil, low-resilience urethane and sponge, are prepared, and calibration information before operation and intention information are measured in a particular arrangement and stored for each vibration medium 3. Calibration is performed by giving an impact to the vibration media 3 by the hand of the user 2 or a particular jig. Conscious information (message data) may be created by combining the measured calibration information.

More specifically, measurement is performed for each vibration medium 3 by keeping the amount of vibration constant and changing a distance L between the vibration sensor module 11 and an impact point (input) or by keeping the distance L constant and changing the magnitude of the inputted impact. Then, signal increase/decrease information (scale range: "maximum/standard/minimum") is stored (registered). An impact by a hand or the like can be thought to be an impulse input (full-frequency input) to the vibration medium 3. By performing an impulse input, the transmission characteristic of a particular vibration medium 3 can be known on the basis of difference in the attenuating frequency. When the transmission characteristic of a vibration medium 3 changes due to temperature change, multiple pieces of reference data may be registered for the same vibration medium 3. As for information having a high correlation with temperature and humidity, such as body motion data, information about temperature and humidity may be registered. In this case, this data may be also used as a threshold at the time of detection.

Figure 5B:
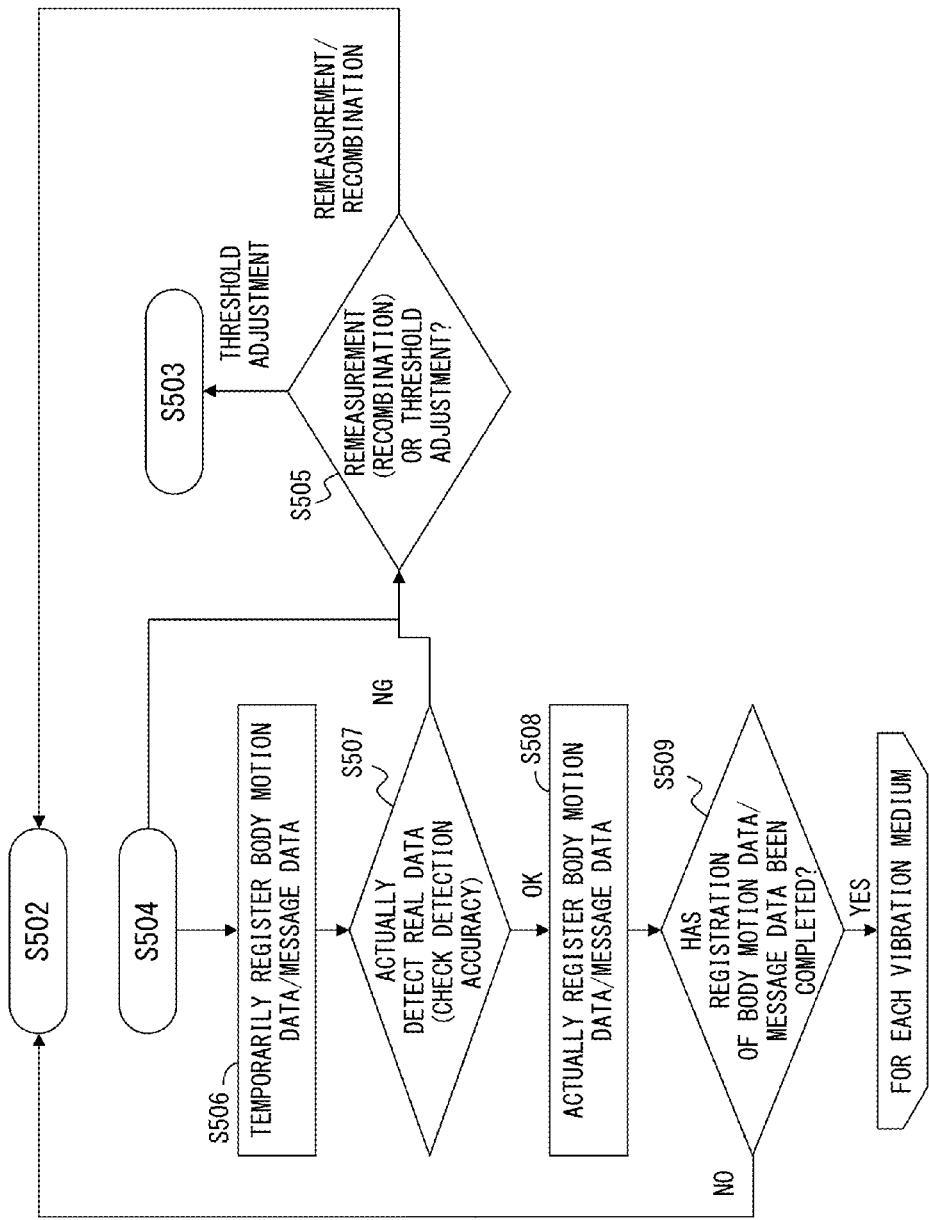
Figure 5C:
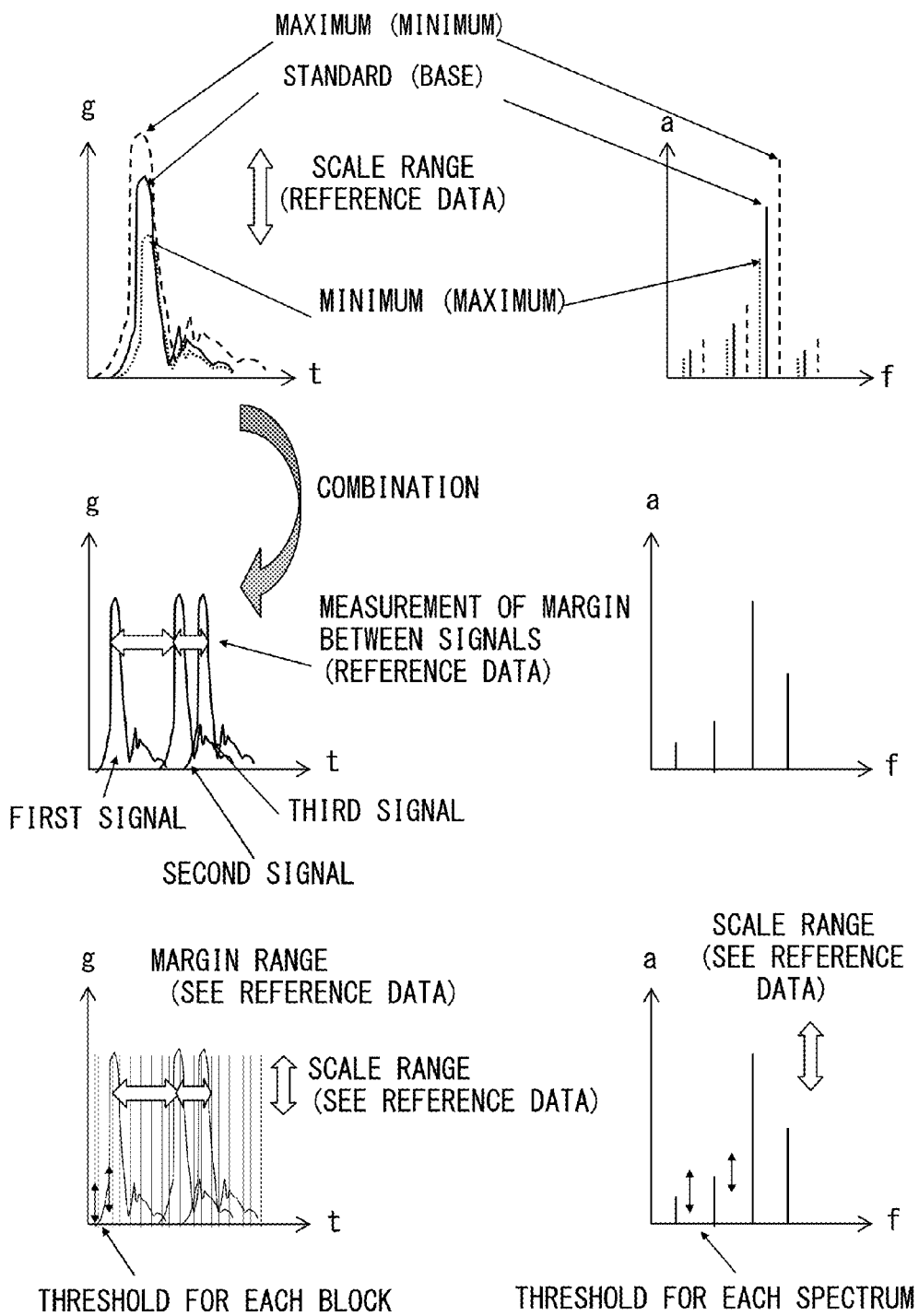
FIG. 5C is a diagram for illustrating the reference data registration process in step S501, S502 and S503 of FIG. 5A.

FIGS. 5A and 5B are flowcharts showing the flow of the reference data registration process, FIG. 5C is a diagram for illustrating the reference data registration process in step S501, S502 and S503 of FIG. 5A, and FIGS. 6A, 6B, 6C and 6D are diagrams showing a structure example of the reference data.

The reference data registration process is executed for each unit of some vibration media 3 having different transmission characteristics.

First, in step S501, measurement is performed by keeping the magnitude of impact constant and changing the distance between the vibration sensor module 11 and an impact point, or by keeping the distance between the vibration sensor module 11 and the impact point constant and changing the magnitude of an inputted impact, and signal increase/decrease information (scale range: "maximum/standard/minimum") is stored (registered). Then, frequency conversion (Fourier Transform) is performed within each scale range.

Next, in step S502, method of averaged response or combination of the registered data (body motion data/message data) is performed. The message data can also be composed by using data for calibration. As for the message data, a time difference (margin) between signals is measured in advance by Cross-Correlation. Then, frequency conversion (Fourier Transform) is performed.

Next, in step S503, a threshold of Cross-Correlation between the registered data and acquired data, and, as for the message data, a margin range between signals (maximum and minimum), a scale range (maximum and minimum) and thresholds for each block and for each spectrum (maximum and minimum) are set in order to perform detection. As for the intention information having a high correlation with temperature and humidity, among the registered data, temperature and humidity thresholds may be registered. The registered thresholds may be used as thresholds at the time of detection. An example of each threshold is shown in FIGS. 6A, 6B, 6C and 6D.

Then, in step S504, the registered data registered in step S501 is captured as input data at the time of actual operation and it is judged whether or not the input data is detected among the registered body motion data/message data.

If the input data is detected (step S504: YES), it is determined in step S505 whether remeasurement and recombination are to be performed or the thresholds are to be adjusted. If remeasurement and recombination are to be performed, the flow returns to step S502. If the thresholds are to be adjusted, the flow returns to step S503.

On the other hand, if the input data is not detected among the registered body motion data/message data (step S504: NO), temporary registration of the body motion data and the message data is performed in step S506.

Then, in step S507, detection accuracy is checked. If the accuracy does not satisfy a predetermined condition (step S507: NG), the flow proceeds to step S505. If the accuracy satisfies the predetermined condition (step S507: OK), actual registration of the body motion data and the message data is performed in step S508.

Then, in step S509, it is judged whether registration of the body motion data and the message data has been completed. If the registration has not been completed (step S509: NO), the flow returns to step S502. If the registration has been completed, the reference data registration process for the next the vibration medium 3 is executed. Then, when the reference data registration process for all the vibration media 3 is completed, a data set as shown in FIGS. 6A, 6B, 6C and 6D is completed.

Next, the calibration-before-operation process will be described.

Figure 7:
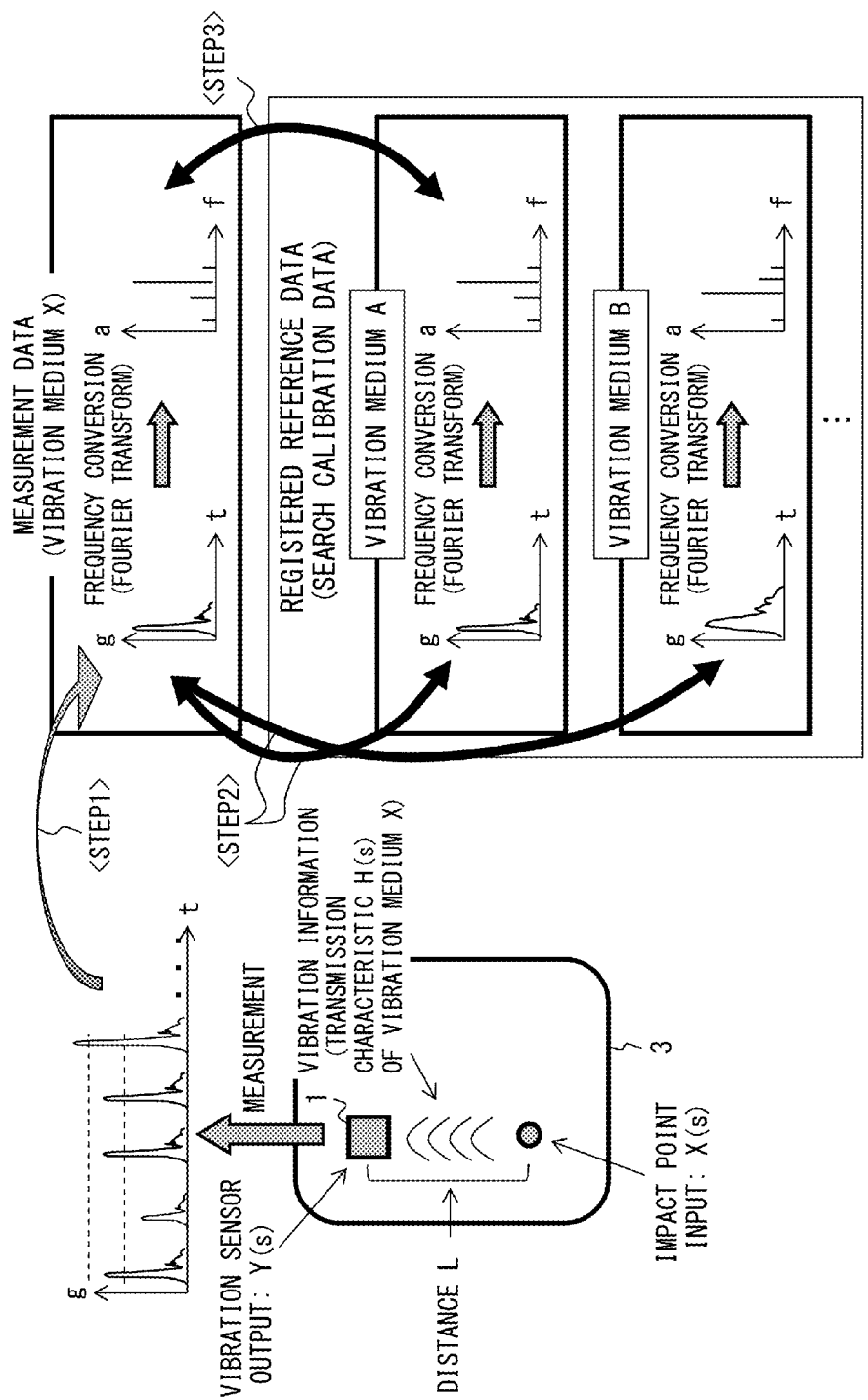
FIG. 7 is a diagram for illustrating the outline of a calibration-before-operation process.

FIG. 7 is a diagram for illustrating the outline of the calibration-before-operation process.

The calibration-before-operation process is a matching process to determine which of the above vibration media 3 for which the reference data is registered the vibration medium 3 used by the user 2 is the most similar to.

By the user 2 giving an impact to the vibration medium 3 by his hand in the arrangement at the time of measurement in the reference data registration and performing measurement and analysis, matching with the registered reference data is performed. Measurement can be performed multiple times.

More specifically, as shown in STEP1 in FIG. 7, Cross-Correlation with the next signal is performed for such data that the amount of vibration is within a threshold range as a target and method of averaged response is performed for such signals that the correlation value exceeds the threshold.

Next, as shown in STEP2 in FIG. 7, synchronously added data is normalized according to the total amount of energy of the registered reference data for each vibration medium 3, and then Cross-Correlation with the reference data is performed. Cross-Correlation between measurement data and the registered reference data may be performed. Then, a correlation value is stored for each vibration medium 3.

Next, as shown in STEP3 in FIG. 7, frequency conversion (Fourier Transform) of the synchronously added and normalized measurement data is performed, and a total of values of difference from the reference data of the vibration media 3 is calculated for each spectrum. The difference value is stored for each vibration medium 3. Then, a vibration medium 3 having a high correlation value and a low difference value is selected on the basis of the correlation values and the difference values and determined as reference data to be used at the time of operation. The values of correlation with and difference from the determined vibration medium 3 are stored. During measurement, vibration information may be sequentially presented to the user 2 in order to uniform the amount of vibration and increase the measurement accuracy. The vibration information may be sequentially presented as a vibration test after the determination of the vibration medium 3 in order for the user 2 to recognize an appropriate amount of vibration (the strength of hitting) before actual operation.

Then, after positioning is performed by Cross-Correlation, matching with the reference data (maximum/standard/minimum) is performed by a method to be described later with the use of FIGS. 8A, 8B, 8C and 8D, and the result is sequentially presented to the user as strength information or the like. If the characteristics of the vibration medium 3 are known in advance, it is possible to present the kinds of registered vibration media 3 by the reference data to cause the user 2 to make a selection, without performing measurement.

FIGS. 8A, 8B, 8C and 8D are diagrams for illustrating the method for matching with the reference data (maximum/standard/minimum).

As shown in FIG. 8A, the total amounts of energy of maximum reference data 81, standard reference data 82 and minimum reference data 83 are calculated in advance. As shown in FIG. 8B, positioning (similarity check) with the standard reference data 82 is performed by performing Cross-Correlation with acquired data 84 as necessary. Then, after the positioning, the total amount of energy of the acquired data is calculated, and it is determined which of the reference data (the maximum reference data 81, the standard reference data 82 and the minimum reference data 83) the acquired data is the most similar to. In the example shown in FIG. 8B, it is judged that the acquired data is the most similar to the standard reference data 82.

Then, as shown in FIG. 8C, on the basis of the ratio of the total amounts of energy of the determined reference data (here, the standard reference data 82) and the acquired data 84, any of the reference data and the acquired data is normalized. In the example shown in FIG. 8C, the acquired data 84 is normalized, and normalized, acquired data 85 is obtained.

Then, as shown in FIG. 8D, the reference data is used to perform detection of the acquired data. The threshold for each block may be adjusted according to the amount of normalization.

Figure 9A:
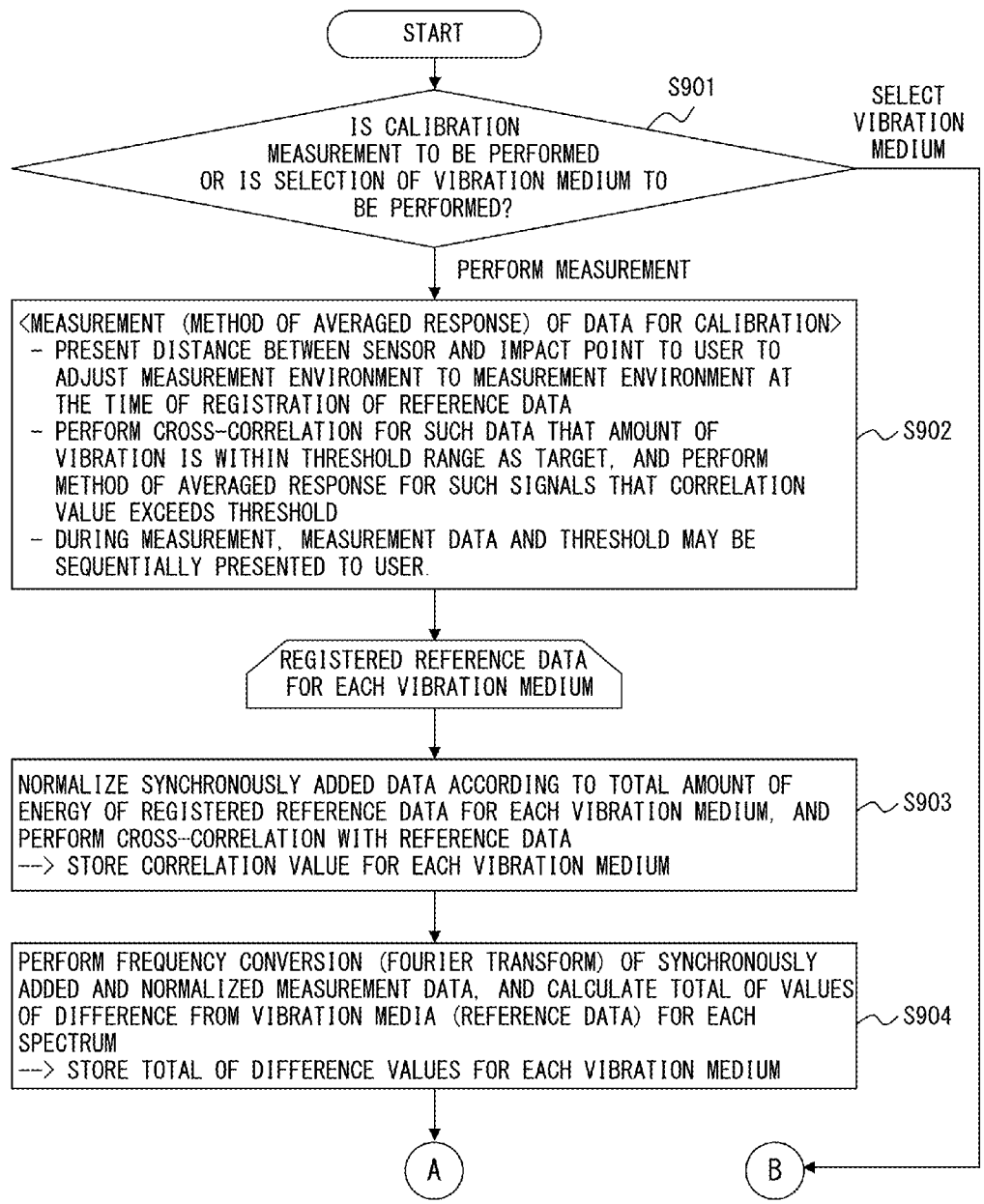
FIGS. 9A and 9B are flowcharts showing the flow of the calibration-before-operation process.
Figure 9B:
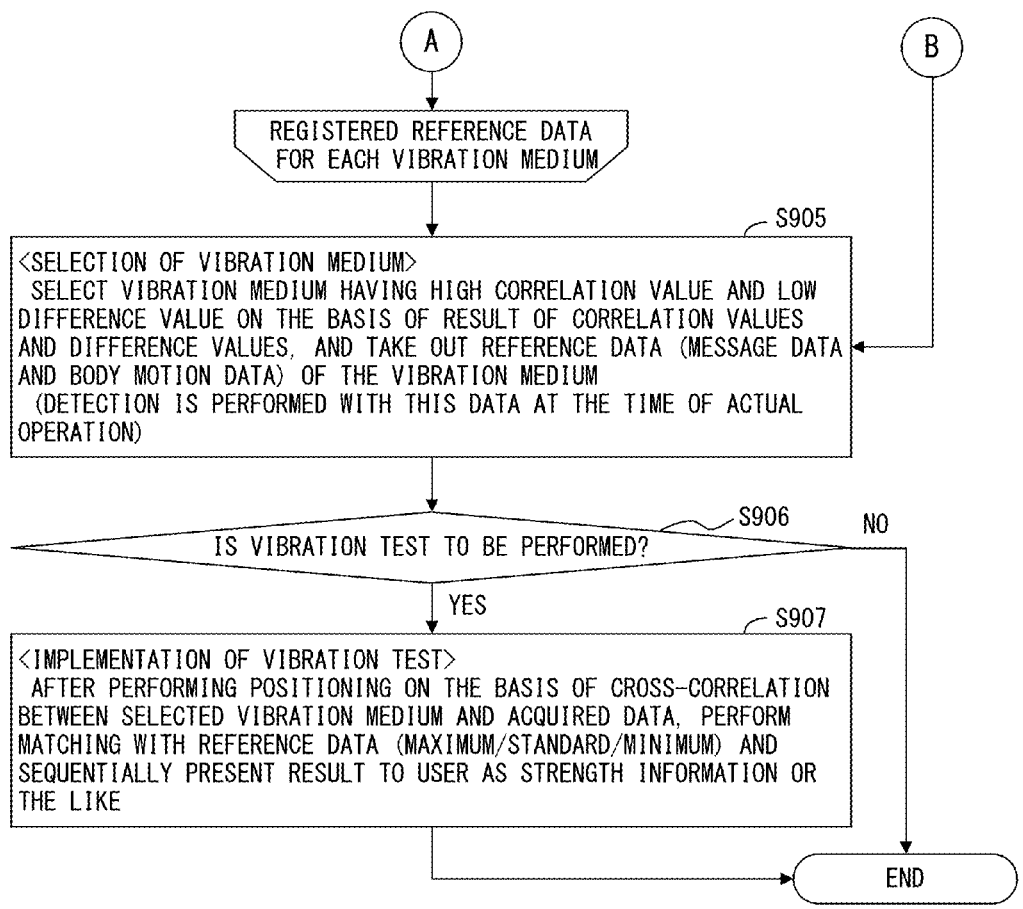

FIGS. 9A and 9B are flowcharts showing the flow of the calibration-before-operation process.

First, in step S901, it is judged whether to perform calibration measurement or to make a selection of a vibration medium 3.

If a selection of a vibration medium 3 is to be made, the flow proceeds to step S905. If calibration measurement is to be performed, measurement (method of averaged response) of data for calibration is performed in step S902. Specifically, first, the distance between the vibration sensor module 11 and an impact point is presented to the user 2 to adjust the measurement environment to the measurement environment at the time of registration of the reference data. Then, mutual correlation is performed for such data that the amount of vibration is within a threshold range as a target, and method of averaged response is performed for such signals that the correlation value exceeds the threshold. During the measurement, measurement data and the threshold may be sequentially presented to the user 2.

Next, in step S903, the synchronously added data is normalized as shown in FIGS. 8A, 8B, 8C and 8D according to the total amount of energy of the registered reference data for each vibration medium 3, and mutual correlation with the reference data is performed. Then, the correlation value is stored.

Next, in step S904, frequency conversion (Fourier Transform) of the asynchronously added and normalized measurement data is performed, and a total of values of difference from the vibration media 3 (the reference data) is calculated for each spectrum. Then, the difference values are stored.

The processes of steps S903 and S904 are repeatedly executed for each of the vibration media 3 for which the reference data is registered.

Next, in step S905, a vibration medium 3 having a high correlation value and a low difference value is selected on the basis of the correlation values and the difference values, and the reference data (message data and body motion data) of the vibration medium 3 is taken out. This reference data is used for calibration at the time of operation, which is to be described later.

Next, in step S906, it is judged whether or not to perform a vibration test.

If the vibration test is not to be performed (step S906: NO), the calibration-before-operation process is ended. If the vibration test is to be performed (step S906: YES), the vibration test is performed in step S907. Specifically, after positioning is performed on the basis of mutual correlation between the selected vibration medium 3 and the acquired data, matching with the reference data (maximum/standard/minimum) is performed by the method described with the use of FIGS. 8A, 8B, 8C and 8D, and the result is sequentially presented to the user 2 as strength information or the like.

Next, the calibration-at-the-time-of-operation process will be described.

Figure 10:
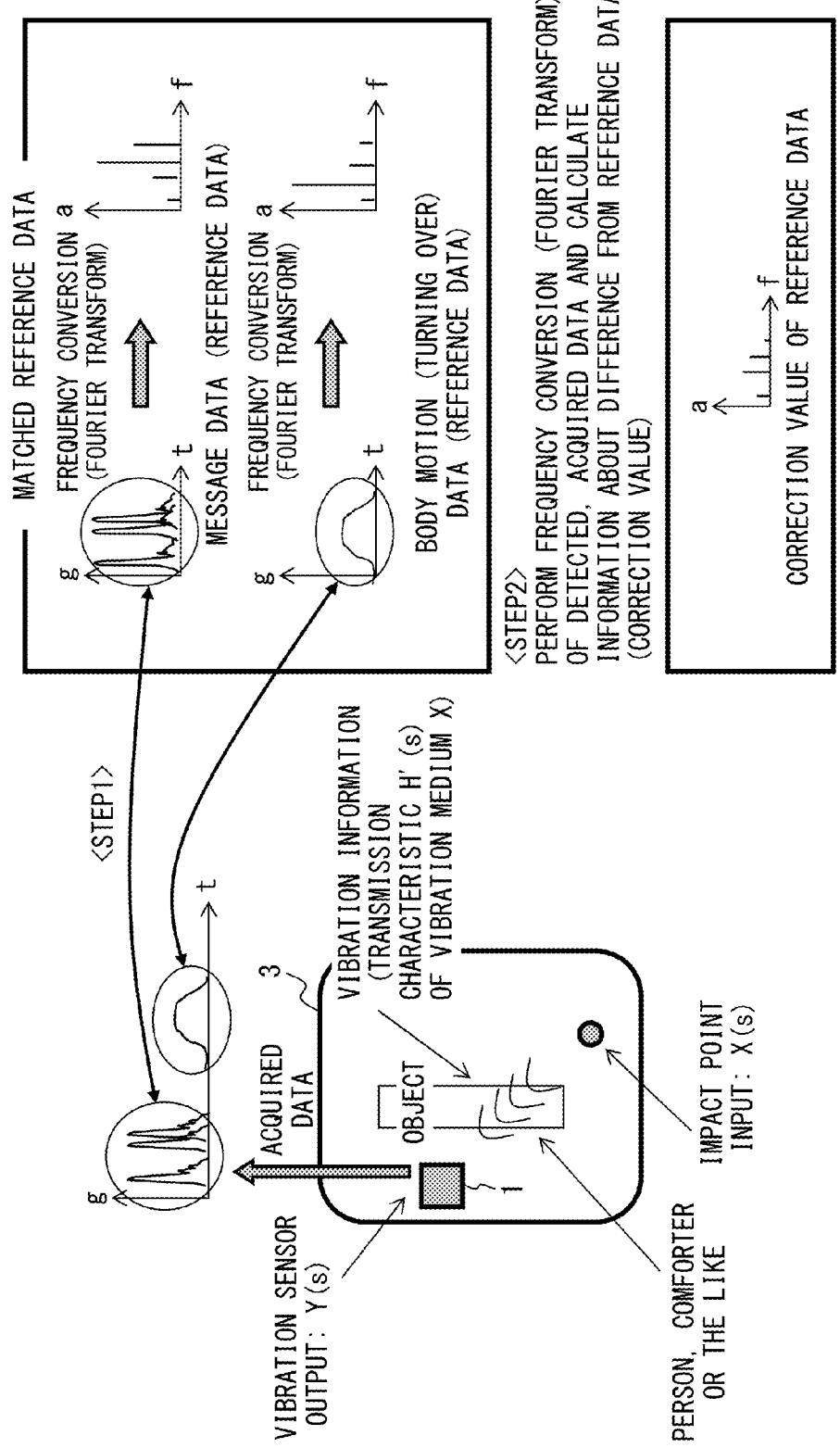
FIG. 10 is a diagram for illustrating the outline of a calibration-at-the-time-of-operation process.

FIG. 10 is a diagram for illustrating the outline of the calibration-at-the-time-of-operation process.

As shown in STEP1 in FIG. 10, the calibration-at-the-time-of-operation process is a process for detecting intention information on the basis of the registered reference data (the vibration medium 3) which has been matched in the calibration-before-operation process described above, and vibration information data acquired from the vibration sensor module 11. However, for conscious message data by an impact with a hand, there may be a case where the vibration medium 3 is different from the registered data due to deterioration over the years, temperature change or the like or a case where an object is steadily placed, and, thus, arrangement of the vibration sensor module 11 and the impact point is different from the arrangement at the time of the calibration-before-operation process. Therefore, the impact point at which an impact is given and the amount of vibration thereof change and the transmission characteristic changes, and the detection accuracy decreases.

In order to correct this, frequency conversion (Fourier Transform) of the vibration information data is performed after detection, and difference from frequency information about the registered reference data is extracted as a correction value for the reference data, as shown in STEP2 in FIG. 10. This correction value can be uniformed by calculating an average among the past several correction values. Furthermore, by subtracting, in advance, the correction value for the reference data from a value of the vibration information data acquired from the vibration sensor module 11 in the frequency domain and performing the detection of intention information described above on the basis of the vibration information data from which the correction value has been subtracted, the detection accuracy in the frequency domain can be improved. Then, by returning the domain to the time domain, the detection accuracy in the time domain can be improved.

Here, a method for detecting message data will be described.

FIGS. 11A and 11B are diagrams for illustrating the method for detecting message data.

In detection of message data, mutual correlation between the reference data and acquired data is performed, and, if the correlation value satisfies a threshold, temporary detection is judged. Then, after signal normalization is performed as shown in FIGS. 8A, 8B, 8C and 8D for the temporarily detected data, it is checked whether or not time difference between signals is within a range or whether or not the amount of energy for each block is within a threshold range to judge whether or not to detect the data as message data. Furthermore, frequency conversion (Fourier Transform) of the normalized signal is performed, and it is judged whether or not the amount of energy for each spectrum is within a threshold range. In order to perform detection, a threshold of mutual correlation between the reference data and the acquired data, a margin range (maximum and minimum) between signals, a scale range (maximum and minimum), thresholds for each block and for each spectrum (maximum and minimum), and, if strength of each signal is used as message information, a scale ratio between signals and a tolerance therefor, temperature and humidity thresholds and the like are set. A data set as shown in FIGS. 6A, 6B, 6C and 6D is used for the initial values of the setting values. As for each of the thresholds described above, if the width is widened, the number of detection mistakes decreases, and the number of erroneous detections increases. If the width is narrowed, the number of detection mistakes increases, and the number of erroneous detections decreases. It is also possible to sequentially control each threshold using difference information between the reference data and the acquired data (a correction value).

Reference numeral 111 in FIG. 11A denotes a range between a maximum value and a minimum value for each block of the reference data. Reference numeral 114 denotes a maximum value of time difference between a first signal and a second signal; reference numeral 112 denotes a standard value of the time difference between the first signal and the second signal; and reference numeral 116 denotes a minimum value of the time difference between the first signal and the second signal. Reference numeral 115 denotes a maximum value of time difference between the second signal and a third signal; reference numeral 113 denotes a standard value of the time difference between the second signal and the third signal; and reference numeral 117 denotes a minimum value of the time difference between the second signal and the third signal. Reference numeral 118 in FIG. 11B denotes a range between a maximum value and a minimum value for each spectrum of the reference data.

Figure 12B:
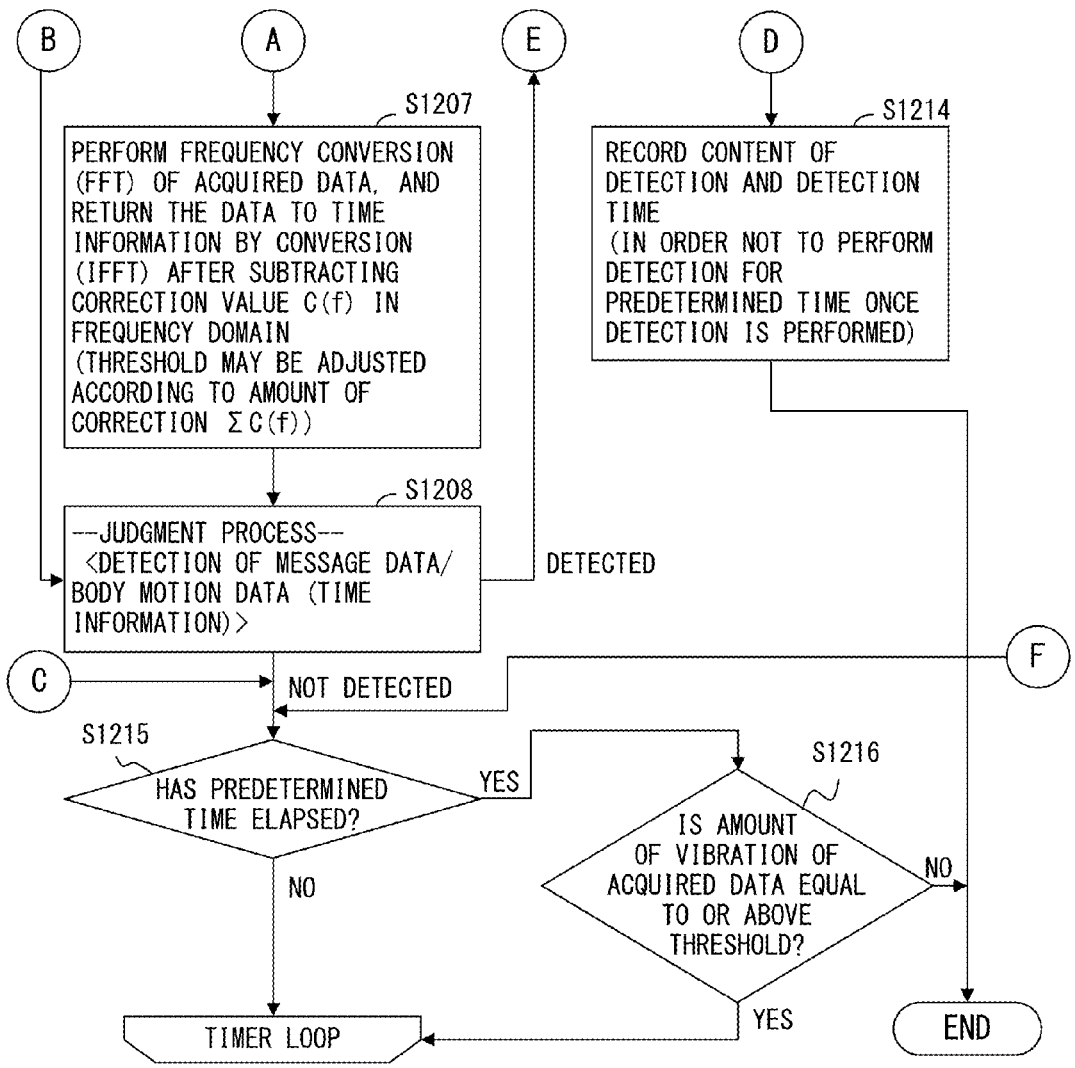
Figure 13B:
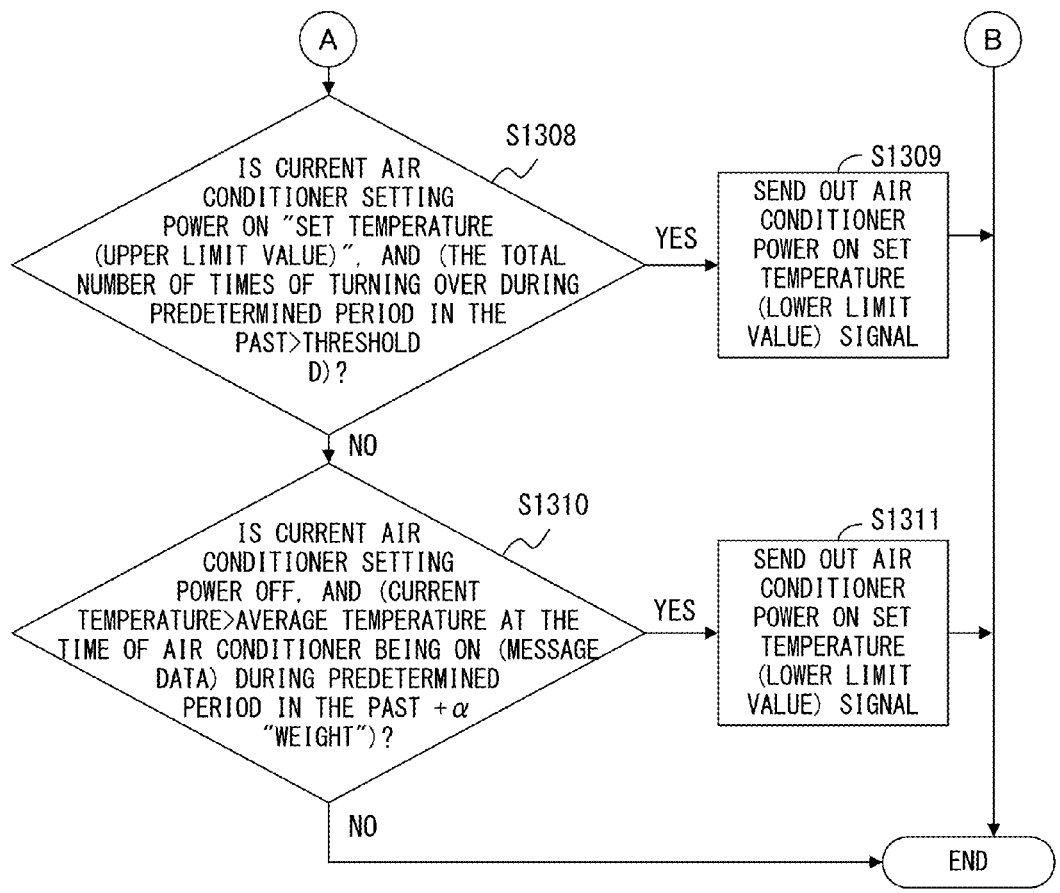

FIGS. 12A and 12B are flowcharts showing the flow of the calibration-at-the-time-of-operation process and an application example (1) after detection of intention information, and FIGS. 13A and 13B are flowcharts showing the flow of an application example (2) after detection of intention information.

The calibration-at-the-time-of-operation process and the application example (1) after detection of intention information shown in FIGS. 12A and 12B is activated by vibration larger than an interruption threshold of the vibration sensor module 11. The application example (2) after detection of intention information shown in FIGS. 13A and 13B is activated by periodical interruption, for example, at intervals of five minutes.

First, in step S1201 in FIG. 12A, a timer is activated. While this timer is being driven, step S1202 and subsequent steps to be described later are executed.

In step S1202, data is read out from the vibration sensor module 11 and stored into a ring buffer together with time information.

Next, in step S1203, it is judged whether or not there is data detected within a predetermined time in the past in order to avoid successive detection.

If the detected data exists (step S1203: YES), the flow proceeds to step S1215 in FIG. 12B. If the detected data does not exist (step S1203 in FIG. 12A: NO), continuity of data is confirmed from writing time. Linear or sprite interpolation processing of necessary data is performed, and the start time of data to be used is determined, in step S1204.

Next, in step S1205, it is judged whether or not the amount of correction $\Sigma C(f)$ is within a predetermined threshold. Here, the amount of correction $\Sigma C(f)$ is a cumulative value of a correction value $C(f)$ which is difference information between frequency-converted reference data $Yref(f)$ and acquired data $Y(f)$.

If the amount of correction $\Sigma C(f)$ is not within the predetermined threshold (step S1205: NO), the correction value $C(f)$ is initialized ($C(f)=0$) in step S1206, and the flow proceeds to step S1208 in FIG. 12B.

On the other hand, if the amount of correction $\Sigma C(f)$ is within the predetermined threshold (step S1205 in FIG. 12A: YES), frequency conversion (Fast Fourier Transform) processing (FFT) of the acquired data is performed, and the data is returned to time information by inverse conversion (Inverse Fast Fourier Transform) processing (IFFT) after subtracting the correction value $C(f)$ in the frequency domain, in step S1207 in FIG. 12B. For the first time, $C(f)=0$ is set. The threshold used at the time of detection may be adjusted according to the amount of correction $\Sigma C(f)$.

Next, in step S1208, detection of message data and body motion data in time information is performed by the method as described with the use of FIGS. 11A and 11B. When the amount of correction $\Sigma C(f)$ is not within the threshold in step S1205 in FIG. 12A (step S1205: NO), it is also possible to compare the result of the amount of correction $\Sigma C(f)$ of the vibration medium 3 selected in the "calibration-before-operation" process described above and the result of the amount of correction $\Sigma C(f)$ in the case of selecting another vibration medium 3 and redetermine a vibration medium 3 with a smaller amount of correction as the vibration medium 3 selected in the "calibration-before-operation" process.

Then, if the message data and body motion data in time information is not detected, the flow proceeds to step S1215 in FIG. 12B. If the data is detected, detection of message data and body motion data in frequency information is performed in step S1209 in FIG. 12A. The normalized, acquired data is frequency-converted (in accordance with Fourier Transform), and difference between the reference data and the acquired data is calculated for each spectrum. If the difference is within a threshold range, it is judged that the message data and body motion data has been detected. At the same time, the correction value C(f) between the reference data and the acquired data is calculated. As for the normalization, the normalization may be performed with a main frequency after time information before the normalization is converted to frequency information.

Then, the message data and body motion data in frequency information is not detected, the flow proceeds to step S1215 in FIG. 12B. If the data is detected, a process like one of steps S1210 to S1213 is executed.

That is, if turning over (body motion data) is detected, 1 is added to the number of times of turning over in step S1210 in FIG. 12A.

If message data indicating that the air conditioner is powered off is detected, an air conditioner power off signal is sent out to the air conditioner unit 4, and the content of the message and the room temperature are stored, in step S1211.

If message data indicating that the air conditioner is powered on is detected, an air conditioner power on signal is sent out to the air conditioner unit 4, and the content of the message and the room temperature are stored, in step S1211 only when the current room temperature is equal to or above a lower limit temperature registered in advance.

If message data indicating that the TV is powered on is detected, a TV power on signal is sent out, and the content of the message is stored, in step S1213.

Then, in step S1214 in FIG. 12B, the content of the detection and the detection time are recorded so that detection is not performed for a predetermined time once detection is performed.

If it is judged in step S1203 in FIG. 12A that the data detected within the predetermined time in the past exists, if the message data and body motion data in time information is not detected in step S1208 in FIG. 12B, and if the message data and body motion data in frequency information are not detected in step S1209 in FIG. 12A, then it is judged in step S1215 in FIG. 12B whether a predetermined time has elapsed or not.

If the predetermined time has not elapsed (step S1215: NO), the flow returns to the beginning of the timer loop of step S1202 in FIG. 12A. If the predetermined time has elapsed (step S1215 in FIG. 12B: YES), it is judged in step 1216 whether or not the amount of vibration of the acquired data is equal to or above a threshold.

Then, if the amount of vibration of the acquired data is equal to or above the threshold (step S1216: YES), the flow returns to the beginning of the timer loop of step S1202 in FIG. 12A. If the amount of vibration is not equal to or above the threshold (step S1216 in FIG. 12B: NO), the calibration-at-the-time-of-operation process and the application example (1) after detection of intention information is ended.

Next, the application example (2) after detection of intention information will be described.

First, in step S1301 in FIG. 13A, the current number of times of turning over, which is body motion data, the room temperature and the current time are stored into a nonvolatile memory. After storing them, the number of times of turning over is initialized to 0, and the total number of times of turning over during a predetermined period in the past is calculated. Furthermore, an average temperature at the time of power on control being performed for the air conditioner unit 4 (message data) for the predetermined time in the past is calculated.

Next, in step S1302, it is judged whether or not the current air conditioner setting is "on", and the current room temperature is lower than the registered lower limit temperature (current room temperature<registered lower limit temperature) or the total number of times of turning over during the predetermined period in the past is smaller than a threshold A (the total number of times of turning over during predetermined period in the past<threshold A).

If the current air conditioner setting is "on", and the current room temperature is lower than the registered lower limit temperature or the total number of times of turning over during the predetermined period in the past is smaller than the predetermined threshold A (step S1302: YES), then an air conditioner power off signal is sent out to the air conditioner unit 4, and a TV power off signal is sent out, in step S1303.

If, in step S1304, the current air conditioner setting is "power off", the current room temperature is higher than the registered lower limit temperature (current room temperature>registered lower limit temperature), and the number of times of turning over is larger than a predetermined threshold B (the number of times of turning over>threshold B) (step S1304: YES), then an air conditioner power on "set temperature (lower limit value)" signal is sent out to the air conditioner unit 4 in step S1305.

If, in step 1306, the current air conditioner setting is power on "set temperature (lower limit value)", and the total number of times of turning over during the predetermined period in the past is smaller than a predetermined threshold C (the total number of times of turning over during predetermined period in the past<threshold C) (step S1306: YES), then an air conditioner power on "set temperature (upper limit value)" signal is sent out to the air conditioner unit 4 in step S1307.

If, in step S1308 in FIG. 13B, the current air conditioner setting is power on "set temperature (upper limit value)", and the total number of times of turning over during the predetermined period in the past is larger than a predetermined threshold D (the total number of times of turning over during predetermined period in the past>threshold D) (step S1308: YES), then an air conditioner power on "set temperature (lower limit value)" signal is sent out to the air conditioner unit 4 in step S1309.

If, in step S1310, the current air conditioner setting is "power off", and the current room temperature is higher than an average temperature at the time of the air conditioner being on (message data) during a predetermined period in the past+α (current temperature>average temperature at the time of air conditioner being on (message data) during a predetermined period in the past+α(weight)) (step S1310: YES), then an air conditioner power on "set temperature (lower limit value)" signal is sent out to the air conditioner unit 4 in step S1311.

FIG. 14 is a diagram showing the hardware configuration of the apparatus control device 1 to which the present invention is applied.

The apparatus control device 1 shown in FIG. 1 can be realized, for example, by using an information processing apparatus (computer) shown in FIG. 14. The apparatus control device 1 shown in FIG. 14 is provided with the CPU 17, memories (the ROM 12 and the RAM 13), an input device 1003, an output device 1004, the external recording device 14, a medium driving device 1006 and a network connection device 1007. These are connected with one another via a bus 1008.

The memories (the ROM 12 and the RAM 13) store a program and data used by the apparatus control device. The CPU 17 performs the apparatus control process described above by executing the program using the memories (the ROM 12 and the RAM 13).

The input device 1003 is, for example, a keyboard, a pointing device and the like and used for inputting an instruction and information from a user. The output device 1004 is, for example, a display device, a printer, a speaker or the like and used for making an inquiry to the user or outputting a processing result. The output device 1004 can also be used as the display module 19 in FIG. 1.

The external recording device 14 is, for example, a magnetic disk device, an optical disk device, a magneto-optical disk device, a tape device or the like. The external recording device 14 includes a hard disk drive also. The apparatus control device 1 can store a program and data in the external recording device 14 and can load them to the memories (the ROM 12 and the RAM 13) to use them.

The medium driving device 1006 drives a portable-type recording medium 1009 and accesses the content recorded therein. The portable-type recording medium 1009 is a memory device, a flexible disk, an optical disk, a magneto-optical disk device or the like. This portable-type recording medium 1009 includes a CD-ROM (Compact Disk Read Only Memory), a DVD (Digital Versatile Disk), a USB (Universal Serial Bus), a memory and the like also. The user can store the program and data in the portable-type recording medium 1009 to load them to the memories (the ROM 12 and the RAM 13) or store detection information and the like stored in the memories (the ROM 12 and the RAM 13) and the external recording device 14 into the portable-type recording medium 1009.

As described above, a computer-readable recording medium storing the program and data used for the apparatus control process includes physical (non-temporary) recording media like the memories (the ROM 12 and the RAM 13), the external recording device 14 and the portable-type recording medium 1009.

The network connection device 1007 is a communication interface which is connected to a wired or wireless communication network such as a LAN (Local Area Network) and which performs data conversion accompanying communication. The apparatus control device 1 can receive the program and data from an external apparatus via the network connection device 1007 and load them to the memories (the ROM 12 and the RAM 13) to use them. The apparatus control device 1 is assumed to be a relatively small apparatus (device) generally called "a built-in apparatus" and can be implemented in a remote controller or the like.

Figure 15:
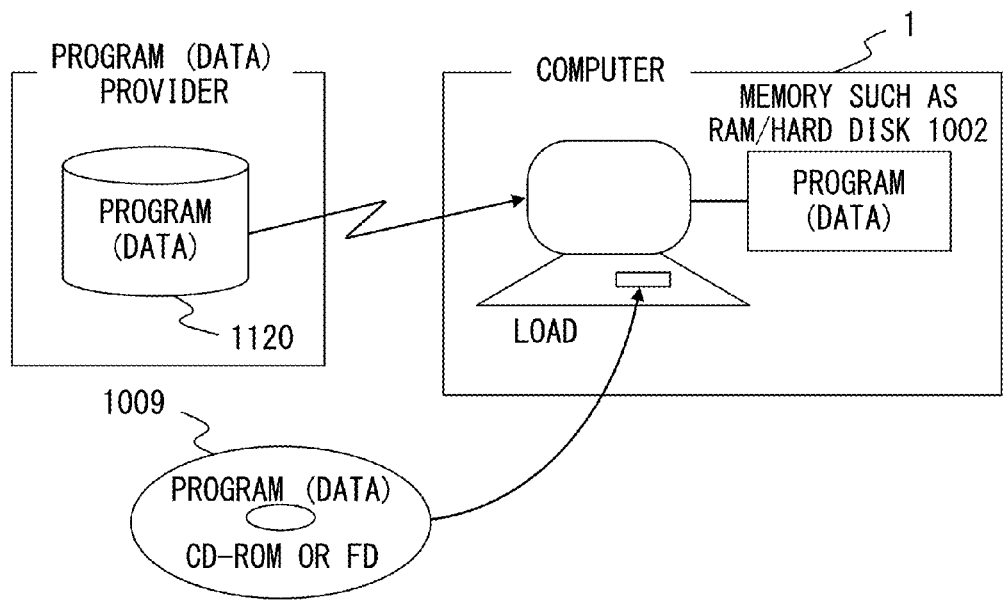
FIG. 15 is a diagram showing a method for providing a program and data to an information processing apparatus.

FIG. 15 is a diagram showing a method for providing the program and data to the information processing apparatus.

For example, the program and data stored in the external recording device 14 are loaded to the memories (the ROM 12 and the RAM 13) of the apparatus control device 1. The external apparatus connectable via the network connection device 1007 generates a carrier signal which carries a program and data 1120 and transmits the carrier signal to the apparatus control device 1 via any transmission medium on the communication network.

As a method for loading the control program of the apparatus control device 1 and basic data to the memories (the ROM 12 and the RAM 13), the program and the basic data are loaded to the RAM 13 or written into the ROM 12 with a dedicated jig (generally, a device called ICE (In-circuit Emulator)) or the like. If the control program written in as described above is implemented with a mechanism capable of updating the control program and the basic data, it is possible to automatically perform rewriting or output various data to the outside as described above, for example, using a network device (network communication via a wireless LAN or the like). Exchange of data with a smartphone in FIG. 2 described above is the case.

The disclosed embodiment and the advantages thereof have been described in detail. One skilled in the art can make various alterations, additions and omissions without departing from the scope of the present invention definitely described in CLAIMS.

According to the present embodiment, it is advantageous that, even if a vibration medium for transmitting an external impact to an electronic apparatus has a different transmission characteristic, intention information obtained by a vibration sensor can be accurately discriminated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relates to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory computer-readable recording medium having stored therein an apparatus control program for controlling an apparatus to be a control target, the apparatus control program causing a computer to execute a process, the process comprising:
    selecting a vibration medium corresponding to first vibration data, by referring to a reference data storage unit storing reference vibration data in association with vibration medium information identifying the vibration medium, on the basis of matching between the first vibration data and the reference vibration data, the first vibration data corresponding to first vibration transmitted via the vibration medium and detected by a vibration detection unit;
    selecting reference vibration data corresponding to second vibration data, from among the reference vibration data stored in the reference data storage unit on the basis of the second vibration data and a correction value of the reference vibration data, the second vibration data corresponding to second vibration transmitted via the selected vibration medium and detected by the vibration detection unit;
    updating a correction value of the selected reference vibration data on the basis of the second vibration data; and
    generating a control signal for controlling the apparatus on the basis of the selected reference vibration data.

2. The apparatus control program medium according to claim 1, wherein the apparatus is an air conditioner, and the vibration medium is a bed.

3. The apparatus control program medium according to claim 1, wherein
the vibration data includes message data corresponding to vibration intentionally generated by a user and body motion data corresponding to vibration generated by a body motion of the user, and
the reference vibration data includes reference data for the message data and reference data for the body motion data.

4. The apparatus control program medium according to claim 1, wherein updating the correction value of the reference vibration data is performed by calculating a difference value between a value obtained by frequency-converting the second vibration data and a value obtained by frequency-converting the selected reference vibration data as the correction value of the reference vibration data.

5. The apparatus control program medium according to claim 4, wherein selecting the reference vibration data is performed on the basis of a value obtained by subtracting a correction value of the reference vibration data calculated on the basis of third vibration data corresponding to third vibration detected by the vibration detection unit prior to the second vibration, from a value of the second vibration data.

6. An apparatus control system comprising a vibration medium, an apparatus to be a control target and an apparatus control device configured to control the apparatus, wherein
the apparatus control device comprises:
a vibration sensor configured to detect vibration transmitted via the vibration medium;
a memory configured to store reference vibration data corresponding to the vibration in association with vibration medium information identifying the vibration medium;
a processor configured to select the vibration medium corresponding to first vibration data, by referring to the memory, on the basis of matching between the first vibration data and the reference vibration data, the first vibration data corresponding to first vibration transmitted via the vibration medium and detected by the vibration sensor, select reference vibration data corresponding to second vibration data, from among the reference vibration data stored in the memory on the basis of the second vibration data and a correction value of the reference vibration data, the second vibration data corresponding to second vibration transmitted via the selected vibration medium and detected by the vibration sensor, and update a correction value of the selected reference vibration data on the basis of the second vibration data; and
a control signal transmitter configured to generate a control signal for controlling the apparatus, on the basis of the reference vibration data selected by the processor and to transmit the generated control signal to the apparatus.

7. The apparatus control system according to claim 6, wherein the apparatus is an air conditioner, and the vibration medium is a bed.

8. The apparatus control system according to claim 6, wherein
the vibration data includes message data corresponding to vibration intentionally generated by a user and body motion data corresponding to vibration generated by a body motion of the user, and
the reference vibration data includes reference data for the message data and reference data for the body motion data.

9. The apparatus control system according to claim 6, wherein updating the correction value of the reference vibration data is performed by calculating a difference value between a value obtained by frequency-converting the second vibration data and a value obtained by frequency-converting the selected reference vibration data as the correction value of the reference vibration data.

10. The apparatus control system according to claim 9, wherein selecting the reference vibration data is performed on the basis of a value obtained by subtracting a correction value of the reference vibration data calculated on the basis of third vibration data corresponding to third vibration detected by the vibration sensor prior to the second vibration, from a value of the second vibration data.

11. An apparatus control device configured to control an apparatus to be a control target, the apparatus control device comprising:
a vibration sensor configured to detect vibration transmitted via a vibration medium;
a memory configured to store reference vibration data corresponding to the vibration in association with vibration medium information identifying the vibration medium;
a processor configured to select the vibration medium corresponding to first vibration data, by referring to the memory, on the basis of matching between the first vibration data and the reference vibration data, the first vibration data corresponding to first vibration transmitted via the vibration medium and detected by the vibration sensor, select on the basis of second vibration data corresponding to vibration detected by the vibration sensor and a correction value of the reference vibration data, reference vibration data corresponding to second vibration data, from among the reference vibration data stored in the memory on the basis of the second vibration data and a correction value of the reference vibration data, the second vibration data corresponding to second vibration transmitted via the selected vibration medium and detected by the vibration sensor, and update a correction value of the selected reference vibration data on the basis of the second vibration data; and
a control signal generator configured to generate a control signal for controlling the apparatus on the basis of the reference vibration data selected by the processor.

12. The apparatus control device according to claim 11, wherein the apparatus is an air conditioner, and the vibration medium is a bed.

13. The apparatus control device according to claim 11, wherein
the vibration data includes message data corresponding to vibration intentionally generated by a user and body motion data corresponding to vibration generated by a body motion of the user, and
the reference vibration data includes reference data for the message data and reference data for the body motion data.

14. The apparatus control device according to claim 11, wherein updating the correction value of the reference vibration data is performed by calculating a difference value between a value obtained by frequency-converting the second vibration data and a value obtained by frequency-converting the selected reference vibration data as the correction value of the reference vibration data.

15. The apparatus control device according to claim 14, wherein selecting the reference vibration data is performed on the basis of a value obtained by subtracting a correction value of the reference vibration data calculated on the basis of third vibration data corresponding to third vibration detected by the vibration sensor prior to the second vibration, from a value of the second vibration data.

* * * * *